US012615599B2

(12) United States Patent
Tang et al.

(10) Patent No.: US 12,615,599 B2
(45) Date of Patent: Apr. 28, 2026

(54) METHODS AND APPARATUSES FOR FLEXIBLE RADIO FREQUENCY UTILIZATION

(71) Applicant: HUAWEI TECHNOLOGIES CO., LTD., Guangdong (CN)

(72) Inventors: Hao Tang, Guangdong (CN); Jianglei Ma, Kanata (CA); Xiaoyan Bi, Guangdong (CN); Peiying Zhu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 18/333,823

(22) Filed: Jun. 13, 2023

(65) Prior Publication Data

US 2023/0328664 A1 Oct. 12, 2023

Related U.S. Application Data

(63) Continuation of application No. PCT/CN2020/138869, filed on Dec. 24, 2020.

(51) Int. Cl.
*H04W 52/52* (2009.01)
*H04W 16/28* (2009.01)
*H04W 56/00* (2009.01)

(52) U.S. Cl.
CPC ........... *H04W 52/52* (2013.01); *H04W 16/28* (2013.01); *H04W 56/0015* (2013.01)

(58) Field of Classification Search
CPC .. H04W 52/52; H04W 16/28; H04W 56/0015
See application file for complete search history.

(56) References Cited

U.S. PATENT DOCUMENTS

2017/0048808 A1* 2/2017 Huang .................. H04W 52/52
2019/0090227 A1* 3/2019 Tsai ..................... H04W 72/046
2022/0174507 A1* 6/2022 Takada .................. H04W 24/08

OTHER PUBLICATIONS

NTT DOCOMO, Inc., "Discussion of efficient activation/deactivation mechanism for SCells", 3GPP TSG RAN WG1 #103-e, e-Meeting, Oct. 26-Nov. 13, 2020, R1-2009197 (Year: 2020).*
3GPP TSG RAN WG1 #103-e R1-2009197,"Discussion on efficient activation/deactivation mechanism for SCells", NTT DOCOMO, Inc, e-Meeting, Oct. 26-Nov. 13, 2020, total 4 pages.
3GPP TSG RAN WG1 Meeting #103-e R1-2008322, "Discussion on efficient activation/de-activation mechanism for SCells", Huawei, HiSilicon, E-meeting, Oct. 26-Nov. 13, 2020, total 6 pages.

* cited by examiner

*Primary Examiner* — Joseph A Bednash
(74) *Attorney, Agent, or Firm* — Slater Matsil, LLP

(57) ABSTRACT

The present disclosure provides methods and apparatuses for flexible radio frequency (RF) utilization and switching. In some embodiments, carriers and/or panels are activated and deactivated at an apparatus as needed, to conserve power at the apparatus. Fast carrier activation and fast panel activation are provided, to reduce carrier activation delay and panel activation delay. Round robin patterns for obtaining carrier-specific measurement information and panel-specific measurement information are also provided, to further reduce carrier and panel activation delay. Further, RF chain and/or antenna switching between multiple carriers at the apparatus is provided to improve data throughput.

21 Claims, 20 Drawing Sheets

110,170 or 172

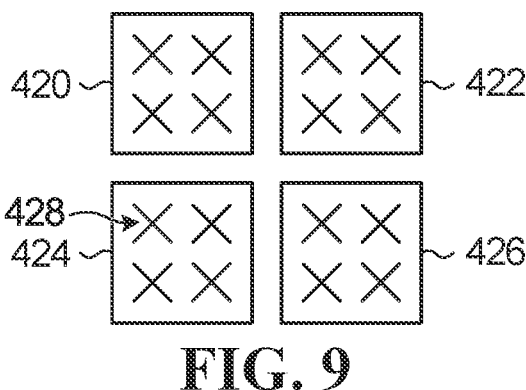
FIG. 9
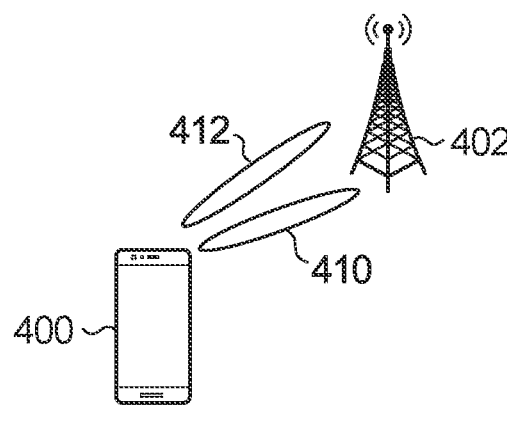
FIG. 10
FIG. 11

Figure 21:
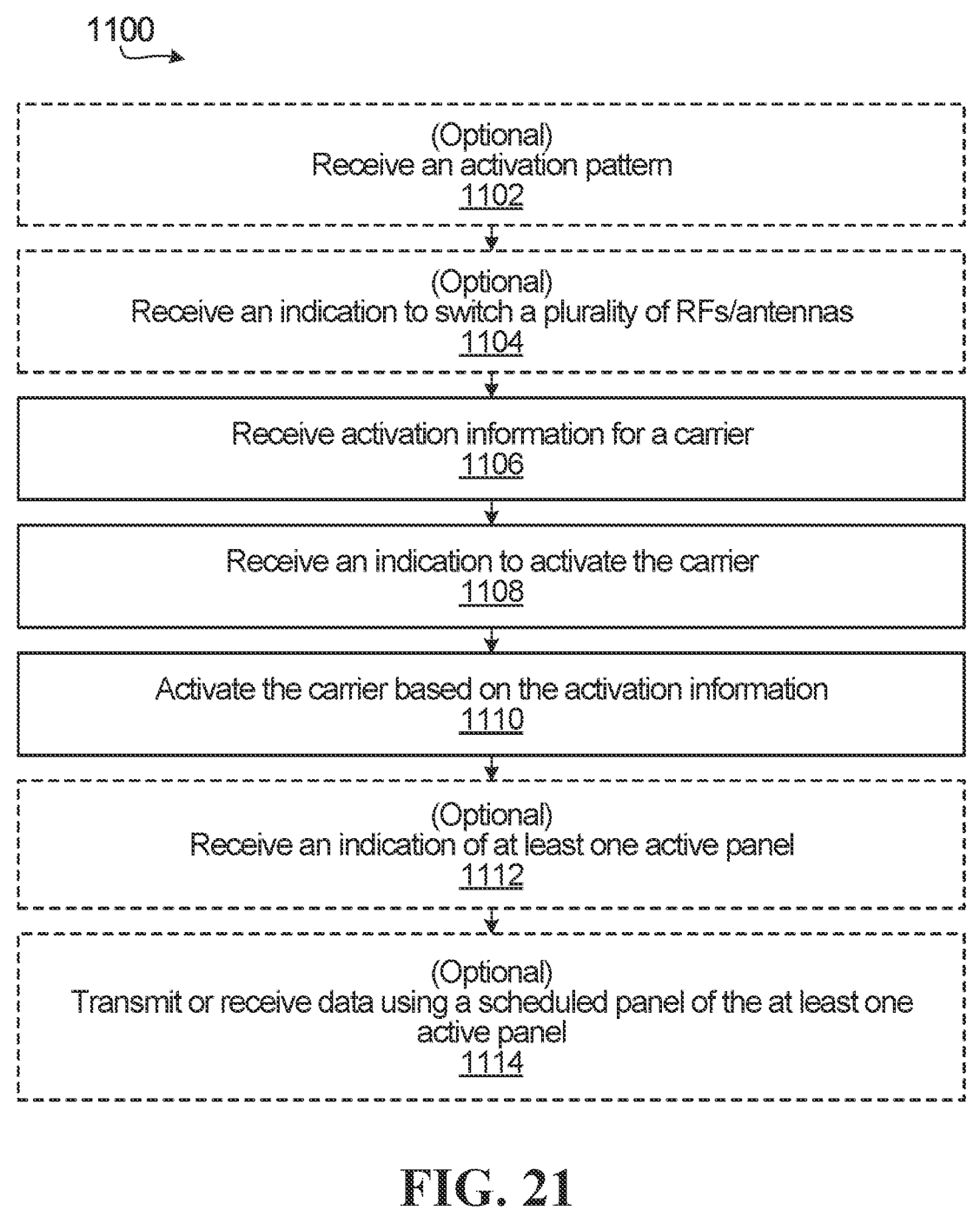

1100

```
+-----------------------------------------------------------+
|                        (Optional)                         |
|                Receive an activation pattern              |
|                           1102                            |
+-----------------------------------------------------------+
                             |
                             v
+-----------------------------------------------------------+
|                        (Optional)                         |
|        Receive an indication to switch a plurality        |
|                     of RFs/antennas                       |
|                           1104                            |
+-----------------------------------------------------------+
                             |
                             v
+-----------------------------------------------------------+
|           Receive activation information for a carrier    |
|                           1106                            |
+-----------------------------------------------------------+
                             |
                             v
+-----------------------------------------------------------+
|            Receive an indication to activate the carrier  |
|                           1108                            |
+-----------------------------------------------------------+
                             |
                             v
+-----------------------------------------------------------+
|      Activate the carrier based on the activation         |
|                       information                         |
|                           1110                            |
+-----------------------------------------------------------+
                             |
                             v
+-----------------------------------------------------------+
|                        (Optional)                         |
|        Receive an indication of at least one active panel |
|                           1112                            |
+-----------------------------------------------------------+
                             |
                             v
+-----------------------------------------------------------+
|                        (Optional)                         |
|    Transmit or receive data using a scheduled panel of    |
|                  the at least one active panel            |
|                           1114                            |
+-----------------------------------------------------------+
```

(Optional)
Transmit an activation pattern
1302

(Optional)
Transmit an indication to switch a plurality of RFs/antennas
1304

Transmit activation information for a carrier
1306

Transmit an indication to activate the carrier
1308

(Optional)
Transmit an indication of at least one active panel
1310

(Optional)
Configure a timing gap
1312

1400

METHODS AND APPARATUSES FOR FLEXIBLE RADIO FREQUENCY UTILIZATION

CROSS-REFERENCE TO RELATED APPLICATION

This application is a continuation of International Application No. PCT/CN2020/138869, filed on Dec. 24, 2020, the disclosure of which is hereby incorporated by reference in its entirety.

FIELD

The present disclosure generally relates to wireless communication and, in particular embodiments, to methods and apparatuses for flexible radio frequency utilization.

BACKGROUND

An air interface is the wireless communications link between two or more communicating devices, such as a base station (also commonly referred to as an evolved NodeB, NodeB, NR base station, a transmit point, a remote radio head, a communications controller, a controller, and the like) and a user equipment (UE) (also commonly referred to as a mobile station, a subscriber, a user, a terminal, a phone, and the like).

A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources, typically referred to as "time-frequency resources".

Two devices that wirelessly communicate with each other over time-frequency resources need not necessarily be a UE and a base station. For example, two UEs may wirelessly communicate with each other over a sidelink using device-to-device (D2D) communication. As another example, two network devices (for example, a terrestrial base station and a non-terrestrial base station, such as a drone) may wirelessly communicate with each other over a backhaul link.

When devices wirelessly communicate with each other, the wireless communication may be performed over a spectrum of frequencies occupying a bandwidth. A wireless communication may be transmitted on a carrier frequency. A carrier frequency will be referred to as a carrier. Different mechanisms are currently available in long-term evolution (LTE) and/or new radio (NR) to try to increase the bandwidth for the wireless communication, e.g. to allow for more throughput. As one example, carrier aggregation (CA) may be implemented in which multiple carriers are assigned to the same UE. Time-frequency resources may be allocated for communicating on any of the carriers. As another example, dual connectivity (DC) may be implemented. The UE may simultaneously transmit and receive data on multiple carriers from two cell groups via a master base station and a secondary base station, where the cell group corresponding to the master base station is called a master cell group (MCG), and the cell group corresponding to the secondary base station is called a secondary cell group (SCG).

However, there are limitations in the mechanisms currently available in LTE and/or NR.

SUMMARY

Using bandwidth/carrier mechanisms such as CA and/or DC, a UE may have multiple active carriers for wireless communication. Further, a UE may have multiple active panels for supporting different communication beams. The use of multiple active carriers and/or panels may increase the data transmission rate to/from the UE. However, multiple active carriers and/or panels may also increase power consumption at the UE. In this way, a trade-off exists between data transmission rate and power consumption with regard to the number of active carriers and/or panels at a UE. Some embodiments provide methods and apparatuses to reduce the power consumption.

One approach to managing power consumption at a UE is to activate carriers and/or panels when the desired transmission rate is high (for example, when a burst of data traffic arrives or is scheduled), and deactivate carriers and/or panels when the desired data transmission rate is relatively small. However, in some cases, there may be an activation delay associated with the activation of carriers and/or panels. This activation delay may result in a poor UE experience, as high data transmission rates might not be rapidly available when desired. When multiple panels and/or carriers are activated in response to the arrival of a burst of data traffic, there may be relatively high carrier and/or panel activation delay that could result in a poor UE experience. Some embodiments provide methods and apparatuses to achieve both UE power saving and fast panel and/or carrier activation.

Current LTE and NR schemes do not consider dynamic transmitting (Tx) and/or receiving (Rx) antenna or RF chain switching among multiple active carriers. Some embodiments provide methods and apparatuses to switch all Tx/Rx antennas or RF chains to a current best carrier, and thus may improve the UE throughput.

According to an aspect of the present disclosure, there is provided a method for an apparatus (such as a UE) in a wireless communication network. The method may include receiving, by the apparatus from a network device, activation information for a carrier, the activation information including at least one of synchronization information, beam management information or automatic gain control (AGC) setting information for the carrier. The method may also include receiving, by the apparatus from the network device, an indication to activate the carrier. The method may further include activating the carrier based on the activation information. The activation information may provide some or all of the information necessary for activation of the carrier, allowing the apparatus to quickly activate the carrier and reduce carrier activation delay. Additionally, the activation information may be independent of a synchronization signal block (SSB), which may avoid some of the carrier activation delay that is associated with an SSB. This aspect provides an example of flexible radio frequency (RF) utilization.

In some embodiments, the method may also include receiving, by the apparatus from the network device, an indication of at least one active panel at the apparatus and/or a scheduled panel at the apparatus. This indication may be received through DCI, which could reduce panel activation delay compared to conventional schemes.

In some embodiments, the method includes receiving, by the apparatus from the network device, one or more activation patterns for obtaining measurement information for a plurality of carriers at the apparatus and/or for obtaining measurement information for a plurality of panels at the apparatus. An activation pattern may include multiple activation periods, where each activation period is to activate a respective carrier or panel to obtain corresponding measurement information. The measurement information may be obtained in advance of activating carriers and/or panels at the apparatus, and as a result may reduce carrier and/or panel activation delay when the carriers and/or panels are activated.

In some embodiments, the method includes receiving, by the apparatus from the network device, an indication to switch a plurality of radio frequency (RF) chains and/or a plurality of antennas from a plurality of carriers to a particular carrier for an uplink measurement on the particular carrier. This switching may rapidly provide measurement information for the particular carrier and may reduce activation delay for the particular carrier.

In some embodiments, the method includes receiving, by the apparatus from the network device, an indication to switch a first RF chain and/or a first antenna from a first carrier of a plurality of carriers to a second carrier of the plurality of carriers. The second carrier may be performing better than the first carrier, and therefore the switching may allow the first RF chain and/or the first antenna to benefit from this better performance. These embodiments provide an example of dynamic and flexible RF switching.

According to another aspect of the present disclosure, there is provided a method for a network device (such as a base station) in a wireless communication network. The method may include transmitting, by the network device to an apparatus, activation information for a carrier, the activation information including at least one of synchronization information, beam management information or AGC setting information for the carrier. The method may further include transmitting, by the network device to the apparatus, an indication to activate the carrier. The apparatus may then activate the carrier based on the activation information with reduced activation delay.

According to yet another aspect of the present disclosure, there is provided an apparatus including at least one processor and a computer readable storage medium operatively coupled to the at least one processor, the computer readable storage medium storing programming for execution by the at least one processor. The programming may include instructions to: receive, from a network device, activation information for a carrier, the activation information including at least one of synchronization information, beam management information or automatic gain control AGC setting information for the carrier; receive, from the network device, an indication to activate the carrier; and activate the carrier based on the activation information.

According to another aspect of the present disclosure, there is provided a network device including at least one processor a computer readable storage medium operatively coupled to the at least one processor, the computer readable storage medium storing programming for execution by the at least one processor. The programming may include instructions to: transmit, to an apparatus, activation information for a carrier, the activation information including at least one of synchronization information, beam management information or AGC setting information for the carrier; and transmit, to the apparatus, an indication to activate the carrier. The apparatus may activate the carrier based on the activation information.

BRIEF DESCRIPTION OF THE DRAWINGS

Reference will now be made, by way of example, to the accompanying drawings which show example embodiments of the present application, and in which:

FIG. 9 illustrates an example of multiple panels supported at a device;

FIG. 10 illustrates an example of a UE communicating with a base station via multiple beams;

FIG. 11 illustrates an example of a UE communicating with multiple base stations via respective beams;

FIG. 21 illustrates, in a flow chart, a method according to embodiments of the present disclosure;

DESCRIPTION OF EXAMPLE EMBODIMENTS

To assist in understanding the present disclosure, examples of a wireless communication system is described below.

Example Communication Systems and Devices

Figure 1:
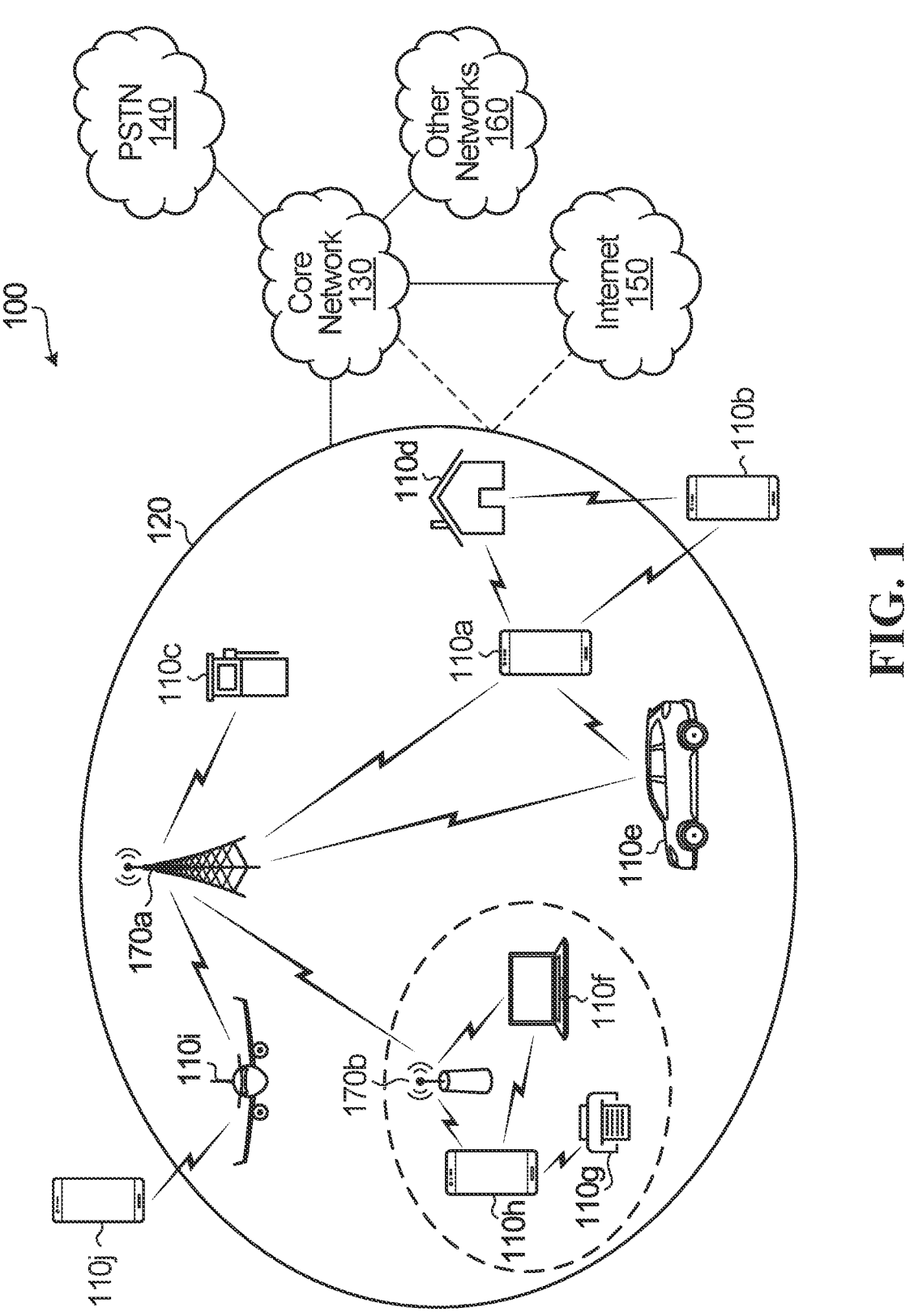
FIG. 1 is a schematic diagram of an example communication system suitable for implementing examples described herein.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another or connected to one or more network nodes (170a, 170b, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

Figure 2:
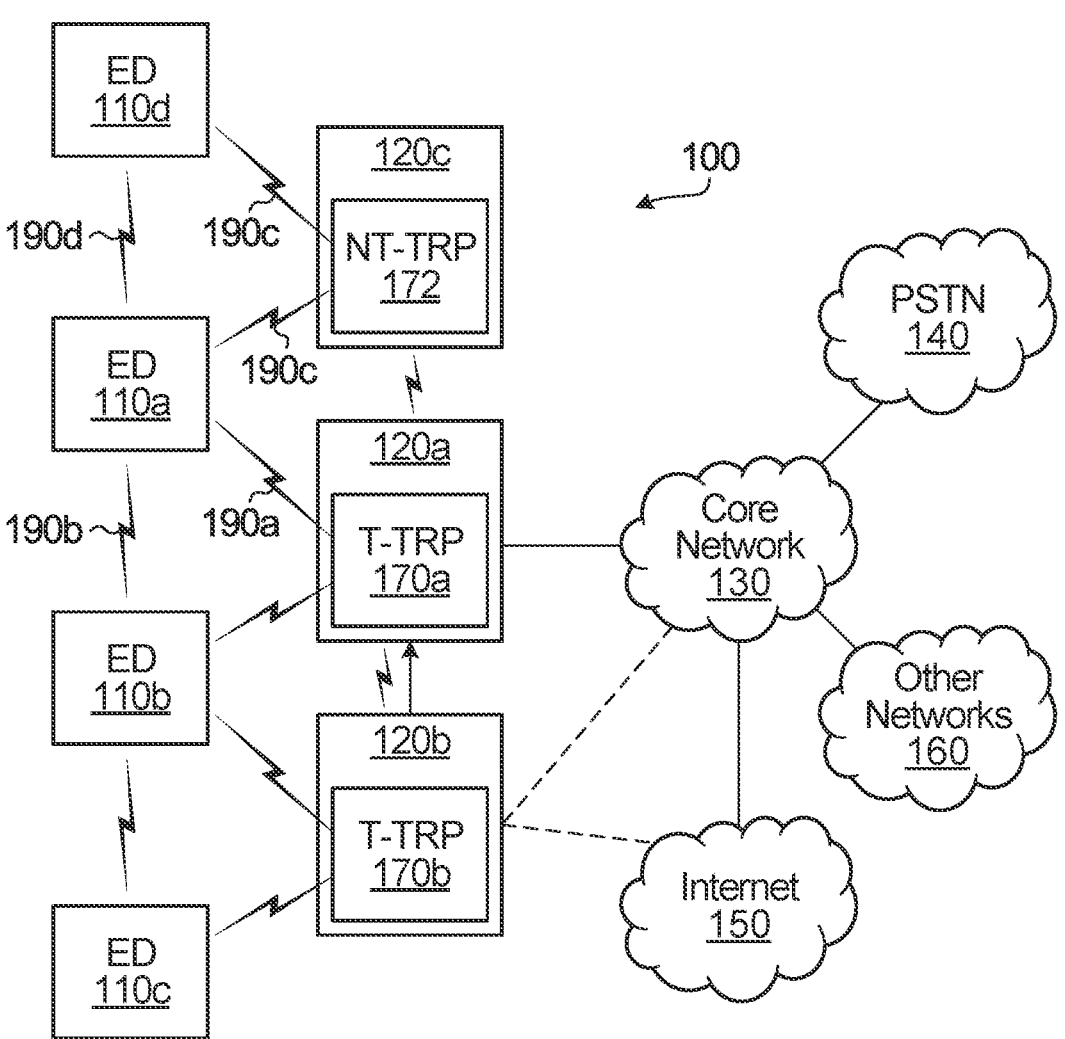
FIG. 2 is a schematic diagram of another example communication system suitable for implementing examples described herein.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. In some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies, and incorporate multiple transceivers necessary to support such.

Figure 3:
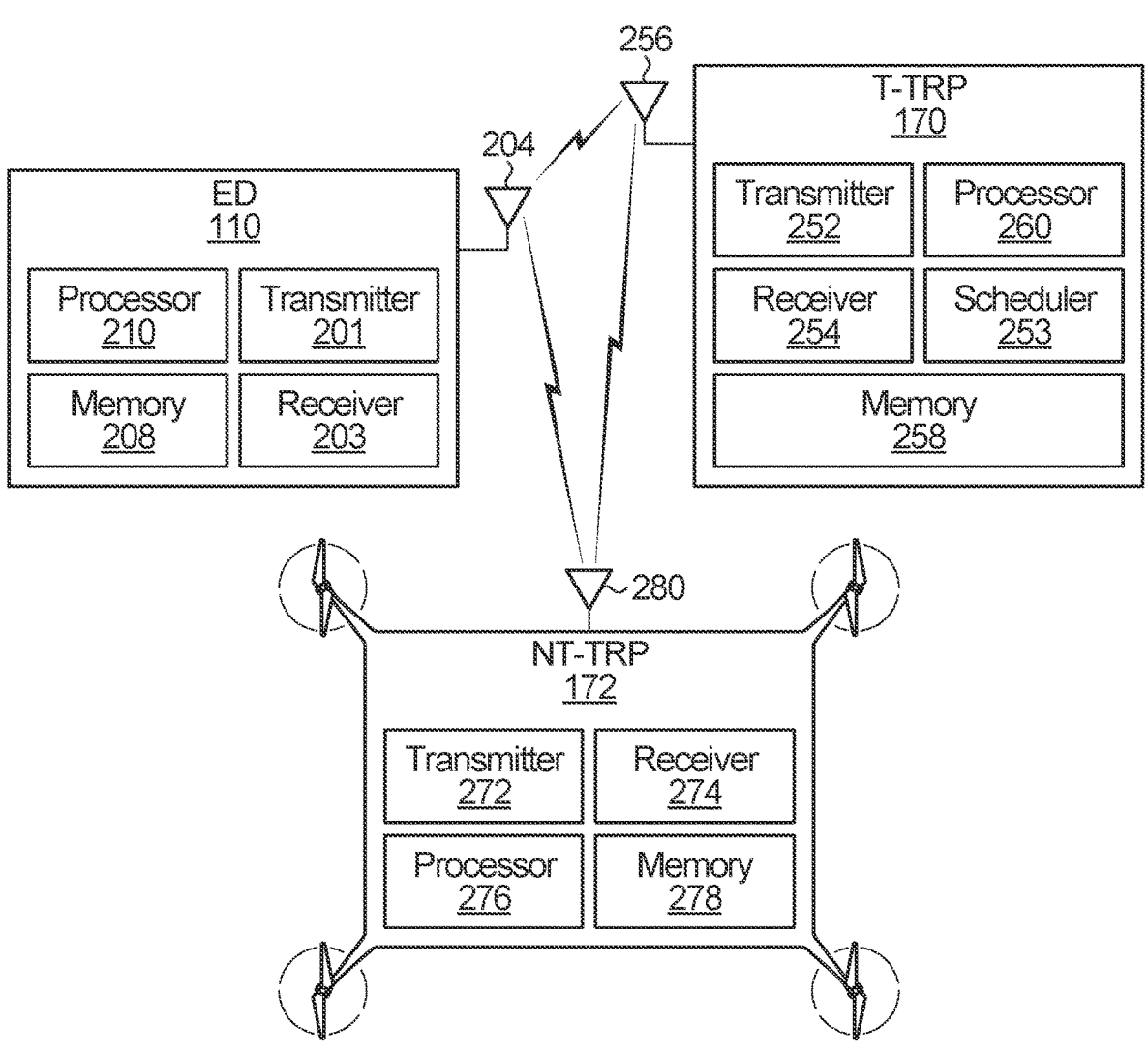
FIG. 3 is a block diagram illustrating example devices that may implement the methods and teachings according to this disclosure.

FIG. 3 illustrates another example of an ED 110 and a base station 170a, 170b and/or 170c. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170a and 170b is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
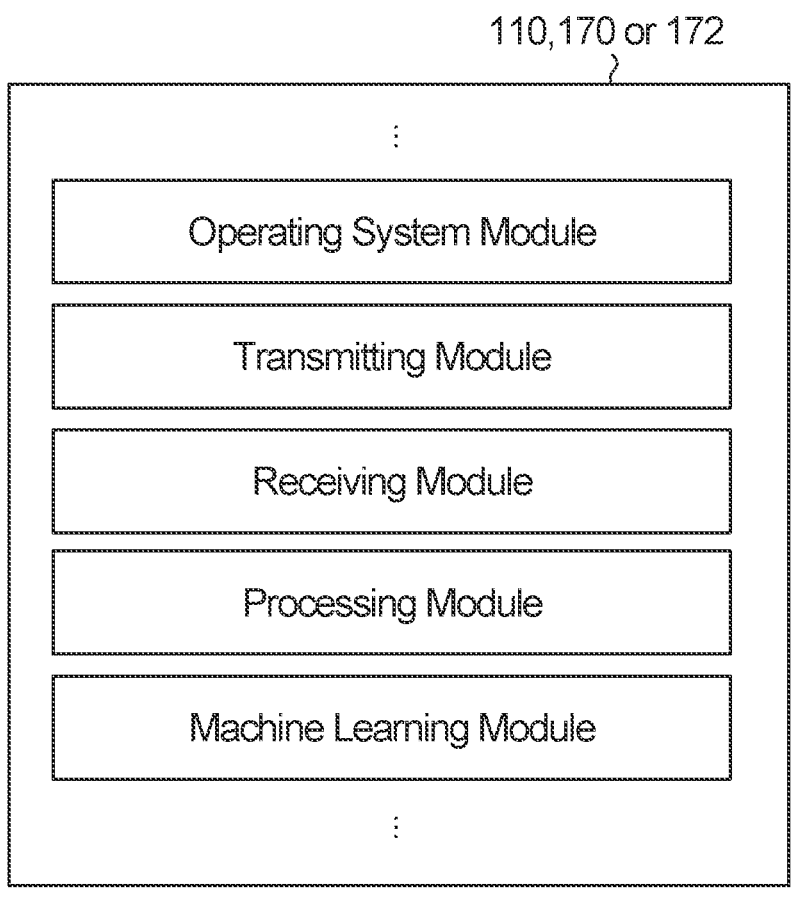
FIG. 4 is a block diagram illustrating example computing modules that may implement the methods and teachings according to this disclosure.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Cells, Carriers, Bandwidth Parts (BWPs) and Occupied Bandwidth

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more BWPs. For example, a carrier may have one or more BWPs. More generally, wireless communication with the device may occur over a wireless spectrum. The spectrum may comprise one or more carriers and/or one or more BWPs. The spectrum may be referred to as frequency resources. Different carriers and/or BWPs may be on distinct frequency resources.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, e.g. sidelink transmitting and receiving resources.

A BWP may be broadly defined as a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

Figure 5:
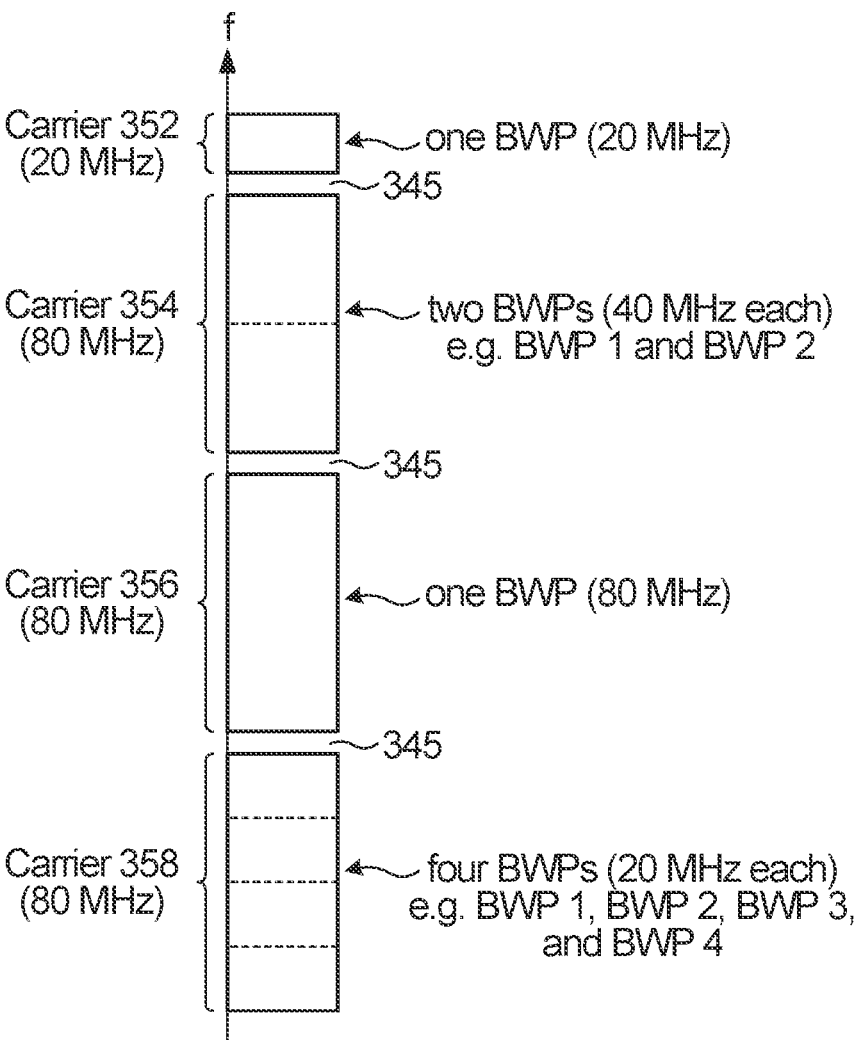
FIG. 5 illustrates four carriers on a frequency spectrum of a wireless medium.

Therefore, in some embodiments, a carrier may have one or more BWPs. As an example, FIG. 5 illustrates four carriers on a frequency spectrum of a wireless medium. The four carriers are respectively labelled carriers 352, 354, 356, and 358. The four carriers are contiguous with each other, except that a guard band 345 may be interposed between adjacent pairs of contiguous carriers. Carrier 352 has a bandwidth of 20 MHz and consists of one BWP. Carrier 354 has a bandwidth of 80 MHz and consists of two adjacent contiguous BWPs, each BWP being 40 MHz, and respectively identified as BWP 1 and BWP 2. Carrier 356 has a bandwidth of 80 MHz and consists of one BWP. Carrier 358 has a bandwidth of 80 MHz and consists of four adjacent contiguous BWPs, each BWP being 20 MHz, and respectively identified as BWP 1, BWP 2, BWP 3, and BWP 4. Although not shown, a guard band may be interposed between adjacent BWPs.

Figure 6:
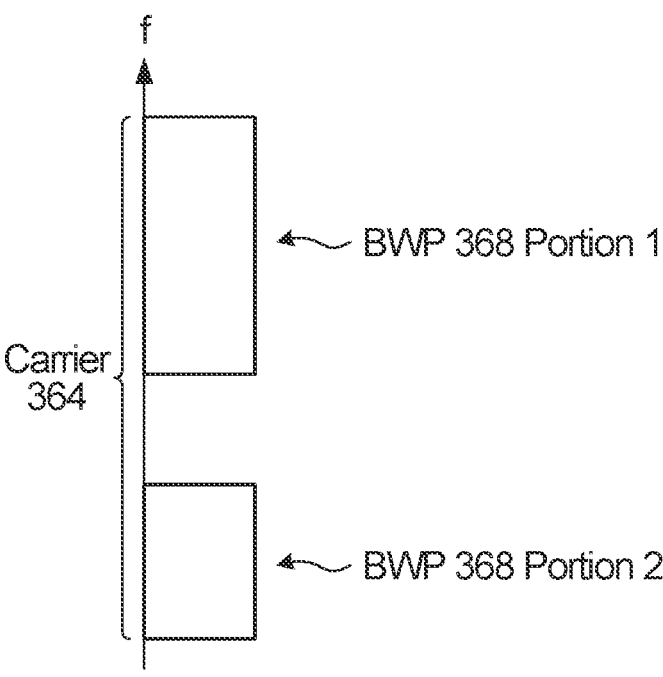
FIG. 6 illustrates a single carrier having a single bandwidth part (BWP) consisting of two non-contiguous spectrum resources.

In some embodiments, a BWP has non-contiguous spectrum resources on one carrier. For example, FIG. 6 illustrates a single carrier 364 having a single BWP 368 consisting of two non-contiguous spectrum resources: BWP portion 1 and BWP portion 2.

Figure 7:
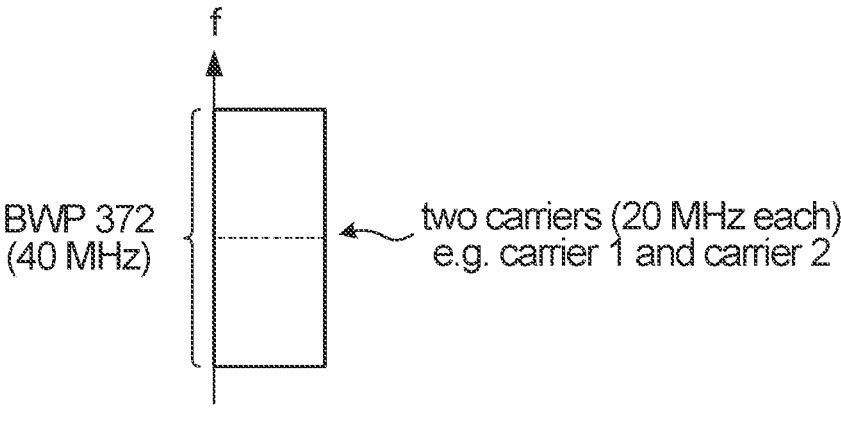
FIG. 7 illustrates a BWP on a frequency spectrum of a wireless medium.

In other embodiments, rather than a carrier having one or more BWPs, a BWP may have one or more carriers. For example, FIG. 7 illustrates a BWP 372 on a frequency spectrum of a wireless medium. BWP 372 has a bandwidth of 40 MHz and consists of two adjacent carriers, labelled carrier 1 and carrier 2, with each carrier having a bandwidth of 20 MHz. Carriers 1 and 2 are contiguous, except that a guard band (not shown) may be interposed between the carriers.

Figure 8:
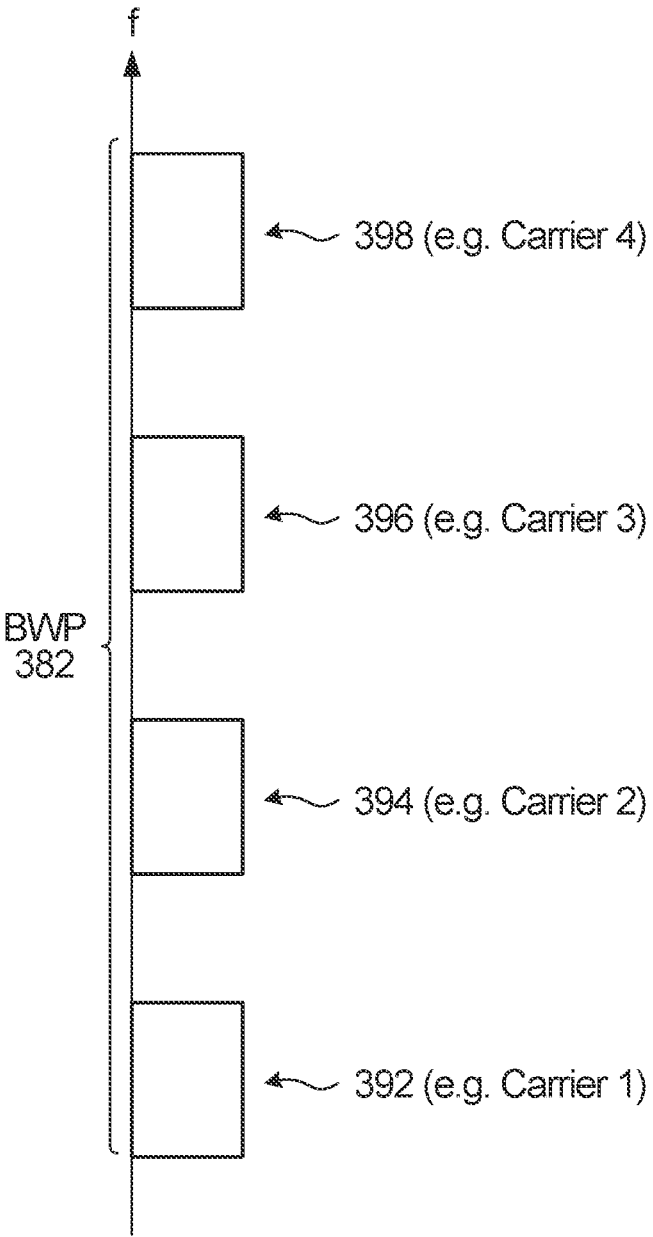
FIG. 8 illustrates a single BWP having four non-contiguous spectrum resources.

In some embodiments, a BWP may comprise non-contiguous spectrum resources which consists of non-contiguous multiple carriers. For example, FIG. 8 illustrates a single BWP 382 having four non-contiguous spectrum resources 392, 394, 396, and 398. Each non-contiguous spectrum resource consists of a single carrier. The first spectrum resource 392 is in a low band (e.g. the 2 GHz band) and consists of a first carrier (carrier 1). The second spectrum resource 394 is in a mmW band and consists of a second carrier (carrier 2). The third spectrum resource 396 (if it exists) is in the THz band and consists of a third carrier (carrier 3). The fourth spectrum resource 398 (if it exists) is in visible light band and consists of a fourth carrier (carrier 4). Resources in one carrier which belong to the BWP may be contiguous or non-contiguous. For example, the frequency resources of carrier 1 might be contiguous or non-contiguous.

Therefore, in view of the examples described in relation to FIGS. 5 to 8, it will be appreciated that a carrier may be a contiguous spectrum block for transmission and/or reception by device, such as a base station or a UE (e.g. like in FIG. 5), or a non-contiguous spectrum block for transmission and/or reception by a device (e.g. like in FIG. 6). A BWP may be a contiguous spectrum block for transmission and/or reception (e.g. like in FIGS. 5 and 7), or a contiguous spectrum block within a carrier (e.g. like in FIG. 5), or a non-contiguous spectrum block (e.g. like in FIGS. 6 and 8). A carrier may have one or more BWPs, or a BWP may have one or more carriers. A carrier or BWP may alternatively be referred to as spectrum.

As used herein, "carrier/BWP" refers to a carrier, or a BWP or both. For example, the sentence "the UE 110 sends a transmission on an uplink carrier/BWP" means that the UE 110 may send the transmission on an uplink carrier (that might or might not have one or more BWPs), or the UE may send the transmission on an uplink BWP (that might or might not have one or more carriers). The transmission might only be on a carrier, or might only be on a BWP, or might be on both a carrier and a BWP (e.g. on a BWP within a carrier).

Wireless communication may occur over an occupied bandwidth. The occupied bandwidth may be defined as the width of a frequency band such that, below the lower and above the upper frequency limits, the mean powers emitted are each equal to a specified percentage $\beta/2$ of the total mean transmitted power, for example, the value of $\beta/2$ is taken as 0.5%.

In some embodiments, a carrier, a BWP and/or an occupied bandwidth may be signaled by a network device (e.g. a base station) dynamically (e.g. in physical layer control signaling such as downlink control information (DCI)), semi-statically (e.g. in radio resource control (RRC) signaling or in the medium access control (MAC) layer), or be predefined based on the application scenario. Alternatively or additionally, a carrier, a BWP and/or an occupied bandwidth may be determined by a UE as a function of other parameters that are known by the UE, or may be fixed, e.g. by a standard.

Control information is discussed herein in some embodiments. Control information may sometimes instead be referred to as control signaling, signaling, configuration information, or a configuration. An example of control information is information configuring different carriers/BWPs. In some cases, control information may be dynamically indicated to the UE, e.g. in the physical layer in a control channel. An example of control information that is dynamically indicated is information sent in physical layer control signaling, e.g. downlink control information (DCI). Control information may sometimes be semi-statically indicated, e.g. in RRC signaling or in a MAC control element (MAC CE). A dynamic indication may be an indication in a lower layer (e.g. physical layer or layer 1 signaling such as DCI), rather than in a higher-layer (e.g. rather than in RRC signaling or in a MAC CE). A semi-static indication may be an indication in semi-static signaling. Semi-static signaling, as used herein, may refer to signaling that is not dynamic, e.g. higher-layer signaling, RRC signaling, and/or a MAC CE. Dynamic signaling, as used herein, may refer to signaling that is dynamic, e.g. physical layer control signaling sent in the physical layer, such as DCI.

In embodiments described herein, "adding" a carrier/BWP for a UE refers to indicating, to the UE, a carrier/BWP that may possibly be used for communication to and/or from the UE. Adding a carrier/BWP may alternatively be referred to as "assigning" the carrier/BWP or "configuring" the carrier/BWP. In some embodiments, adding the carrier/BWP for a UE may include indicating, to the UE, one or more parameters of the carrier/BWP, e.g. indicating the carrier/BWP frequency, the carrier/BWP bandwidth and/or the carrier/BWP index. In some embodiments, the carrier/BWP may be added to a carrier/BWP group that is associated with the UE.

"Activating" a carrier/BWP refers to indicating, to the UE, that the carrier/BWP is now available for use for communication to and/or from the UE. In some embodiments, a carrier/BWP is implicitly or explicitly activated at the same time the carrier/BWP is added for the UE. In other embodiments, a carrier/BWP may be added and then later activated using control signaling (e.g. using dynamic control signaling, such as DCI). Therefore, it is possible in some embodiments that a carrier/BWP be added for the UE but initially deactivated, i.e. not available for wireless communication for the UE, such that no transmissions are scheduled, sent or received by the UE on the carrier/BWP. The carrier/BWP may be subsequently activated, and then possibly deactivated again later.

"Scheduling" a carrier/BWP for a UE refers to scheduling a transmission on the carrier/BWP. Scheduling the carrier/BWP may include indicating time resources for the transmission. In some embodiments, the scheduling of a carrier/BWP may explicitly or implicitly add and/or activate the carrier/BWP for the UE if the carrier/BWP is not previously added and/or activated.

"Removing" a carrier/BWP for a UE refers to indicating, to the UE, that the carrier/BWP is no longer available to be used for communication to and/or from the UE. The carrier/BWP may be removed from a carrier/BWP group associated with the UE. Removing a carrier/BWP may alternatively be referred to as "releasing" the carrier/BWP or "de-configuring" the carrier/BWP. In some embodiments, removing a carrier/BWP is the same as deactivating the carrier/BWP. In other embodiments, a carrier/BWP might be deactivated without being removed.

"Modifying" a carrier/BWP for a UE refers to updating/changing the configuration of a carrier/BWP for a UE, e.g. changing the carrier/BWP index, changing the bandwidth, changing the transmission direction and/or changing the function of the carrier/BWP, etc. In some embodiments, modifying the carrier/BWP does not change the activation status of the carrier/BWP, e.g. if the carrier/BWP is activated then it remains activated after the modification.

"Handover to" a particular carrier/BWP refers to a UE switching from communicating on one carrier/BWP to communicating on the particular carrier/BWP. Similarity, "handover from" a particular carrier/BWP refers to a UE switching from communicating on the particular carrier/BWP to communication on another carrier/BWP. A handover to/from a carrier/BWP may include adding, removing, modifying, activating or deactivating the carrier/BWP.

In general, carriers/BWPs may be added, removed, modified, activated and/or deactivated for a UE via control signaling from the base station, e.g. dynamically in physical layer control signaling (such as in DCI) or semi-statically in higher-layer signaling (such as RRC signaling or in a MAC CE). Adding, removing, modifying, activating and/or deactivating a carrier/BWP may collectively be referred to as managing the carrier/BWP (e.g. RRM for the carrier/BWP). A handover to and/or handover from a carrier/BWP may also be indicated for a UE via control signaling from the base station.

In some embodiments herein, a carrier/BWP is sometimes configured as an "uplink carrier/BWP" or a "downlink carrier/BWP". An uplink carrier/BWP is a carrier or BWP that is configured for uplink transmission. A downlink carrier/BWP is a carrier or BWP that is configured for downlink transmission. In some embodiments, a carrier/BWP may switch from an uplink carrier/BWP to a downlink carrier/BWP, and/or vice versa, e.g. in response to control signaling received from the base station. The control signaling may be dynamic (e.g. physical layer control signaling, such as in DCI) or semi-static (e.g. in higher-layer signaling, such as RRC signaling or in a MAC CE).

In some embodiments, a UE uses radio frequency (RF) components to implement wireless communication over a carrier/BWP. Some RF components may instead be called analog components. Examples of RF components may include one or more of the following: antennas, and/or antenna arrays, and/or power amplifiers, and/or filters, and/or frequency up-convertors, and/or frequency down-convertors, and/or analog-to-digital convertors (ADCs), and/or digital-to-analog convertors (DACs). To implement a wireless communication, a set of RF components are arranged in a particular order to form an RF chain to transmit and/or receive the wireless communication. An RF chain may be a receive RF chain (i.e. an RF chain to receive a wireless communication) or a transmit RF chain (i.e. an RF chain to transmit a wireless communication). A particular group of RF components may be configured as a receive RF chain, a transmit RF chain, or both a receive and transmit RF chain, and a UE may possibly change the configuration.

In some implementations, RF chains and/or other RF components may be turned on and turn off as needed. Turning on an RF chain may enable communications to and/or from the UE using that RF chain. Turning off an RF chain may then disable communications to and/or from the UE using the RF chain. For example, if an RF chain is not actively involved in transmitting or receiving data, the RF chain may be turned off to conserve power at a UE. The RF chain may be turned on again at a later time to transmit and/or receive data. In some embodiments, semi-static signaling (e.g. RRC signaling or MAC CE) or dynamic signaling (e.g. DCI) may indicate which RF chains are turned on/off.

A UE may switch an RF chain and/or an antenna (RF/antenna) between different carriers/BWPs, which may be referred as "RF/antenna switching" or simply "RF switching". For example, a UE may have limited RFs/antennas available and may therefore switch an RF/antenna from a first carrier/BWP to a second carrier/BWP in order to communicate over the second carrier/BWP. RF switching may include switching one or more RF components from one frequency to another frequency by modifying one or more parameters of the RF components (e.g., modifying the up-conversion frequency). For example, RF switching may include antenna switching, power amplifier (PA) switching and/or filter switching. In some cases, RF bandwidth might not be changed after RF switching. Semi-static signaling or dynamic signaling may indicate which RFs/antennas are switched at a UE.

In some embodiments, RF switching to no longer communicate on a carrier will be referred to as "turning the RF off" for the carrier. RF switching to allow for communication on another carrier will be referred to as "turning the RF on" for the carrier. In some embodiments, semi-static signaling or dynamic signaling may indicate which carriers are to have their RF turned on/off.

Alternatively or additionally, a UE may implement RF bandwidth adaptation to communicate over a different carrier/BWP using a particular RF/antenna. RF bandwidth adaption includes adjusting the bandwidth of an RF/antenna, for example, from 20 MHz to 50 MHz. In some cases, RF bandwidth adaptation may be faster than RF switching.

It should be noted that while some embodiments of the present disclosure are described in relation to communications between a UE and a BS (for example, uplink and/or downlink transmissions), the present disclosure is in no way limited to such communications. The embodiments described herein may also or instead be implemented in sidelink, backhaul links and/or vehicle-to-everything (V2X) links, for example. Further, the embodiments described herein may apply to transmissions over licensed spectrum, unlicensed spectrum, terrestrial transmissions, non-terrestrial transmissions (for example, transmissions within non-terrestrial networks), and/or integrated terrestrial and non-terrestrial transmissions.

Integrated Terrestrial Networks and Non-Terrestrial Networks

A terrestrial communication system may also be referred to as a land-based or ground-based communication system, although a terrestrial communication system can also, or instead, be implemented on or in water. The non-terrestrial communication system may bridge the coverage gaps for underserved areas by extending the coverage of cellular networks through non-terrestrial nodes, which will be key to ensuring global seamless coverage and providing mobile broadband services to unserved/underserved regions, in this case, it is hardly possible to implement terrestrial access-points/base-stations infrastructure in the areas like oceans, mountains, forests, or other remote areas.

The terrestrial communication system may be a wireless communication system using 5G technology and/or later generation wireless technology (e.g., 6G or later). In some examples, the terrestrial communication system may also accommodate some legacy wireless technology (e.g., 3G or 4G wireless technology). The non-terrestrial communication system may be a communications using the satellite constellations like conventional Geo-Stationary Orbit (GEO) satellites which utilizing broadcast public/popular contents to a local server, Low earth orbit (LEO) satellites establishing a better balance between large coverage area and propagation path-loss/delay, stabilize satellites in very low earth orbits (VLEO) enabling technologies substantially reducing the costs for launching satellites to lower orbits, high altitude platforms (HAPs) providing a low path-loss air interface for the users with limited power budget, or Unmanned Aerial Vehicles (UAVs) (or unmanned aerial system (UAS)) achieving a dense deployment since their coverage can be limited to a local area, such as airborne, balloon, quadcopter, drones, etc. In some examples, GEO satellites, LEO satellites, UAVs, HAPs and VLEOs may be horizontal and two-dimensional. In some examples, UAVs, HAPs and VLEOs coupled to integrate satellite communications to cellular networks emerging 3D vertical networks consist of many moving (other than geostationary satellites) and high altitude access points such as UAVs, HAPs and VLEOs.

Artificial Intelligence (AI) and Sensing

In some embodiments, devices such as the ED 110, the T-TRP 170 and/or the NT-TRP 172 of FIG. 3 implement sensing technologies and/or AI technologies. Sensing and/or AI may be introduced into a telecommunication system to improve performance and efficiency.

AI and/or machine learning (ML) technologies may be applied in the physical layer and/or in the MAC layer. For the physical layer, AI/ML may improve component design and/or algorithm performance, including but not limited to channel coding, channel modelling, channel estimation, channel decoding, modulation, demodulation, MIMO, waveform, multiple access, PHY element parameter optimization and update, beam forming & tracking, and sensing & positioning. For the MAC layer, AI/ML capabilities such as learning, prediction and decision making, for example, may be utilized to solve complicated problems. According to an example, AI/ML may be utilized to improve functionality in the MAC layer through intelligent TRP management, intelligent beam management, intelligent channel resource allocation, intelligent power control, intelligent spectrum utilization, intelligent MCS, intelligent HARQ strategy, and/or intelligent Tx/Rx mode adaption.

In some embodiments, AI/ML architectures involve multiple nodes. The multiple nodes may be organized into two modes, i.e., centralized and distributed, both of which can be deployed in an access network, a core network, or an edge computing system or third network. The implementation of a centralized training and computing architecture may be restricted by a large communication overhead and strict user data privacy. A distributed training and computing architecture, such as distributed machine learning and federated learning, for example, may include several frameworks. AI/ML architectures could include an intelligent controller which may perform as single agent or multi-agent, based on joint optimization or individual optimization. A protocol and signaling mechanism may provide a corresponding interface link that can be personalized with customized parameters to meet particular requirements while minimizing signaling overhead and maximizing the whole system spectrum efficiency through personalized AI technologies.

Through the use of sensing technologies, terrestrial and non-terrestrial networks can enable a new range of services and applications such as earth monitoring, remote sensing, passive sensing and positioning, navigation, tracking, autonomous delivery and mobility. Terrestrial network-based sensing and non-terrestrial network-based sensing could provide intelligent, context-aware networks to enhance the UE experience. For an example, terrestrial network-based sensing and non-terrestrial network-based sensing could provide opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods might not only enable advanced cross reality (XR) applications, but also enhance the navigation of autonomous objects such as vehicles and drones. Further, measured channel data and sensing and positioning data can be obtained through large bandwidth, new spectrum, dense networks and more line-of-sight (LOS) links. Based on measured channel data and sensing and positioning data, a radio environmental map may be drawn through AI/ML methods, where channel information is linked to its corresponding positioning or environmental information to provide an enhanced physical layer design based on this map.

Sensing coordinators are nodes in a network that can assist in the sensing operation. These nodes can be standalone nodes dedicated to sensing operations or other nodes (for example the T-TRP 170, ED 110, or core network node) that perform sensing operations in parallel with communication transmissions. Protocol and signaling mechanisms may provide a corresponding interface link with customized parameters to meet particular requirements while minimizing signaling overhead and maximizing spectrum efficiency.

AI/ML and sensing methods may be data-hungry. Therefore, in order to involve AI/ML and sensing in wireless communications, a large amount of data may be collected, stored, and exchanged. The characteristics of wireless data may expand in multiple dimensions, such as from sub-6 GHz, millimeter to Terahertz carrier frequencies, from outdoor to indoor environments, and from text, voice to video. The data collecting, processing and usage may be performed in a unified framework or another framework.

Measurement

Measurement is an important procedure in many communication networks, including 4G and 5G networks, for example. Measurements may allow a network to determine the quality of a link between two devices, such as a UE and a BS. In some cases, measurements may be used to determine the quality of a link provided by a particular carrier/BWP, in order to determine whether the carrier/BWP should be added, removed, modified, activated and/or deactivated, for example.

To configure a measurement at a UE, a BS may provide a measurement configuration to the UE through control signaling. The measurement configuration may provide information that allows the UE to perform a measurement and send a measurement report back to the BS. The measurement report may then be used by the BS perform radio resource management (RRM), including but not limited to cell selection and reselection, handover, load balancing, and serving cell addition and/or removal.

In some embodiments, a particular carrier/BWP may be configured for measurement, which means that the carrier/BWP is configured for transmission of a signal that is used to measure the quality of the link provided by the carrier/BWP for RRM, for example. The measurement may be a channel measurement that is used to obtain information about the channel. In some embodiments, a measurement may be a downlink measurement (for example, to obtain information about a downlink channel), an uplink measurement (for example, to obtain information about an uplink channel), a beam measurement (for example, to obtain information about a particular transmission beam), a synchronization measurement (for example, to obtain synchronization information), and/or a timing advance measurement (for example, to obtain information about transmission timing).

According to one example, a downlink carrier/BWP (or at least a carrier/BWP having downlink resources) is used by a base station to transmit, to a UE, a reference signal or a synchronization signal. An example of a reference signal is a channel state information reference signal (CSI-RS). An example of a synchronization signal is a primary synchronization signal (PSS) and/or a secondary synchronization signal (SSS) in a synchronization signal block (SSB). The reference signal and/or synchronization signal is used by the UE to perform a measurement and thereby obtain measurement information. The reference signal and/or synchronization signal may be referred to as a measurement object.

In another example, an uplink carrier/BWP (or at least a carrier/BWP having uplink resources) is used by a UE to transmit a reference signal, for example, a sounding reference signal (SRS). The reference signal is used by a BS to perform a measurement and thereby obtain measurement information. The measurement information may be used by the BS to perform RRM. As an example, if the measurement information indicates that the uplink carrier/BWP is of too low quality, then the BS may deactivate the uplink carrier/BWP for the UE.

Measurement information that is obtained via a measurement may include any, one, some or all of the following types of measurement information: Reference Signal Received Power (RSRP); Reference Signal Received Quality (RSRQ); Signal-to-Noise Ratio (SNR); Signal-to-Noise and Interference Ratio (SINR); Received Signal Strength Indicator (RSSI); Cross Link Interference (CLI); Doppler shift; Doppler spread; average delay; delay spread; Channel Quality Information (CQI); Precoding Matrix Indicator (PMI); Channel State Information-Reference Signal (CSI-RS Resource Indicator (CRI); Synchronization Signal/Physical Broadcast Channel (SS/PBCH) Resource Block Indicator (SSBRI); Layer Indicator (LI); Rank Indicator (RI); Layer1 RSRP; Channel occupancy Ratio (Sidelink CR); and Channel Busy Ratio (Sidelink CBR). These types of measurement information, which may also be referred to as measurement quantities, measurement items or measurement results, are not intended to be limiting. Other types of measurement information are also contemplated.

Following a measurement performed by a UE, a measurement report may be transmitted from the UE to a BS. In some embodiments, the measurement report might be transmitted on the carrier/BWP configured for measurement, for example, in uplink resources on the same carrier/BWP on which a reference signal or synchronization signal was transmitted in the downlink. The measurement report may provide any, some or all of the measurement information obtained via a measurement. The measurement information may then be used by the base station to perform RRM. As an example, if the measurement information indicates that a downlink carrier/BWP is of too low quality, then the BS may deactivate the downlink carrier/BWP for the UE.

Beams and Beamforming

Some embodiments of the present disclosure relate to beams and beamforming in a wireless communication system. A beam may be formed through amplitude and/or phase weighting on data transmitted or received by at least one antenna. Alternatively or additionally, a beam may be formed by using another method, for example, adjusting a related parameter of an antenna unit. A beam may include a transmit (Tx) beam and/or a receive (Rx) beam. A Tx beam indicates a distribution of signal strength formed in different directions in space after a signal is transmitted through an antenna. An Rx beam indicates a distribution of signal strength of a wireless signal received by an antenna that is in different directions in space. Beam information for a beam may include a beam identifier, an antenna port(s) identifier, a channel state information reference signal (CSI-RS) resource identifier, a synchronization signal block (SSB) resource identifier, a sounding reference signal (SRS) resource identifier and/or another reference signal resource identifier.

A UE and/or a BS may support multiple antenna panels (which are also referred to as "panels") for transmitting and/or receiving data using multiple different beams. Each panel may operate as (or provide the functionality of) a unit of antenna group, an antenna array or an antenna sub-array. A particular panel at a UE or a BS can support a transmit and/or receive (Tx/Rx) beam independently of the other panels in the device. As such, multiple panels at a UE or BS may support multiple beams simultaneously, which may increase the rate of data transmission for the UE or the BS.

In some embodiments, "activating" a panel at a UE refers to indicating that the panel is now available for use in communication to and/or from the UE. Activating a panel may also be referred to as "turning on" a panel. An active panel may later be "deactivated" or "turned off", which indicates that the panel is not available for use for communication to and/or from the UE. Activating and deactivating a panel may be performed by turning a RF chain corresponding to that panel on and off.

"Scheduling" a panel at a UE refers to scheduling a transmission on the panel. Scheduling the panel may include indicating time-frequency resources for the transmission. In some embodiments, the scheduling of a panel may explicitly or implicitly activate the panel at the UE if the panel is not previously activated.

In some embodiments, semi-static signaling (e.g. RRC signaling or MAC CE) or dynamic signaling (e.g. DCI) may indicate which panels at a UE are activated, deactivated and/or scheduled.

Examples of devices supporting multiple panels will now be described with reference to FIGS. 9 to 11.

FIG. 9 illustrates an example of multiple panels 420, 422, 424, 426 supported at a device such as a UE or a BS. Each of the panels 420, 422, 424, 426 includes four antennas 428 for data transmission and/or reception (only one antenna 428 is labelled in order to avoid congestion of FIG. 9). The panels 420, 422, 424, 426 enable communication on four separate beams simultaneously at the device. For example, performing amplitude and/or phase weighting at the antennas 428 in the panel 420 may form a beam that is independent of the other panels 422, 424, 426.

FIG. 10 illustrates an example of a UE 400 communicating with a BS 402 via multiple beams 410, 412. Each of the beams 410, 412 are supported by respective panels at the UE 400 and at the BS 402. As such, the UE 400 and the BS 402 may each include at least two panels. The multiple beams 410, 412 may provide an increased data transmission rate between the UE 400 and the BS 402 compared to a single beam.

FIG. 11 illustrates an example of a UE 408 communicating with multiple BSs 404, 406 via respective beams 414, 416. In some implementations, the BS 404 may be a master BS and the BS 406 may be a secondary BS. Each of the beams 414, 416 may be supported by respective panels at the UE 408. As such, the UE 408 may include at least two panels. The BSs 404, 406 may include one or more panels.

Carrier Activation

For a UE, the use of multiple active carriers (for example, in CA and/or DC) and/or the use of multiple active panels can increase the rate of data transmission. However, there are potential drawbacks. For example, if multiple carriers and/or panels are active at a UE, then power consumption at the UE may increase. In this way, the use of multiple carriers and/or panels may provide increased data throughput at the cost of increased power consumption. In some embodiments, power consumption is mitigated by only activating carriers and/or panels at a UE when needed, such when as a burst of data traffic is scheduled or predicted, for example. This activation of multiple carriers and/or panels may provide an increased data transmission rate at the UE to accommodate the burst of data traffic. At least some of the carriers and/or panels may then be deactivated when the desired data transmission rate drops to save power. The activation of carriers and/or panels is an example of flexible RF utilization.

Potential drawbacks of activating carriers and/or panels at a UE as needed are carrier activation delay and panel activation delay. Carrier activation delay is the time required to activate a carrier so that data can be transmitted and/or received on the carrier by a UE. Similarly, panel activation delay is the time required to activate a panel at the UE to support data transmission using the panel. In some cases, excessive carrier and/or panel activation delay at a UE may result in a poor UE experience. For example, when activating a carrier and/or a panel to accommodate a burst of data traffic, excessive carrier and/or panel activation delay may ultimately delay the transmission and/or reception of data. As discussed in further detail elsewhere herein, some embodiments of the present disclosure provide systems and methods to reduce carrier activation delay and/or panel activation delay at a UE, which may improve the UE experience.

Carrier activation delay may depend on any of a number of different factors. A UE may have an inherent carrier activation delay that is dependent on the RF capabilities of the UE. This inherent carrier activation delay may contribute to a total carrier activation delay at the UE.

In some cases, a MAC CE may be used to indicate the activation of a carrier at a UE. The parsing time for this MAC CE at the UE may contribute to the activation delay for the carrier. In this way, carrier activation delay may depend on MAC CE parsing time.

A delay in obtaining carrier-specific measurement information for a carrier to be activated (which is also referred to as an "activating carrier") may also contribute to carrier activation delay. An example of carrier-specific measurement information is CSI measurements for an activating carrier. For example, if there is a relatively large time gap between receiving an indication to activate a carrier and receiving a CSI-RS for the carrier, then carrier activation delay may also be large.

Furthermore, carrier activation delay at a UE may be at least in part due to a delay in performing synchronization, beam management and/or automatic gain control (AGC) setting for an activating carrier. Synchronization signal blocks (SSBs) may be used to perform synchronization, beam management and/or AGC setting for an activating carrier. For example, when activating a carrier, a UE may perform synchronization, beam management and/or AGC setting for the carrier based on SSB measurements. The availability of SSB measurements for a carrier may be defined by an SSB-based measurement timing configuration (SMTC), which configures a periodicity for SSB measurements at a UE. In some cases, this periodicity may be relatively large. For example, the SMTC may configure a periodicity of 5, 10, 20, 40, 80 or 160 ms. A large SSB measurement periodicity may result in a large delay in performing synchronization, beam management and/or AGC setting for an activating carrier, and therefore may also result in a large carrier activation delay.

An aspect of the present disclosure relates to reducing carrier activation delay by reducing the delay for a UE to perform synchronization, beam management and/or AGC setting for an activating carrier. This may be referred to as "fast carrier activation", which may improve throughput at a UE for bursts of data traffic, and thus improve the UE experience. In some embodiments, a BS transmits activation information to a UE before, while or after indicating the activation of a carrier. The UE may use this activation information to perform synchronization, beam management and/or AGC setting for the activation of the carrier, without relying on SSB measurements. As such, the UE may avoid the carrier activation delay associated with an SMTC.

Figure 12:
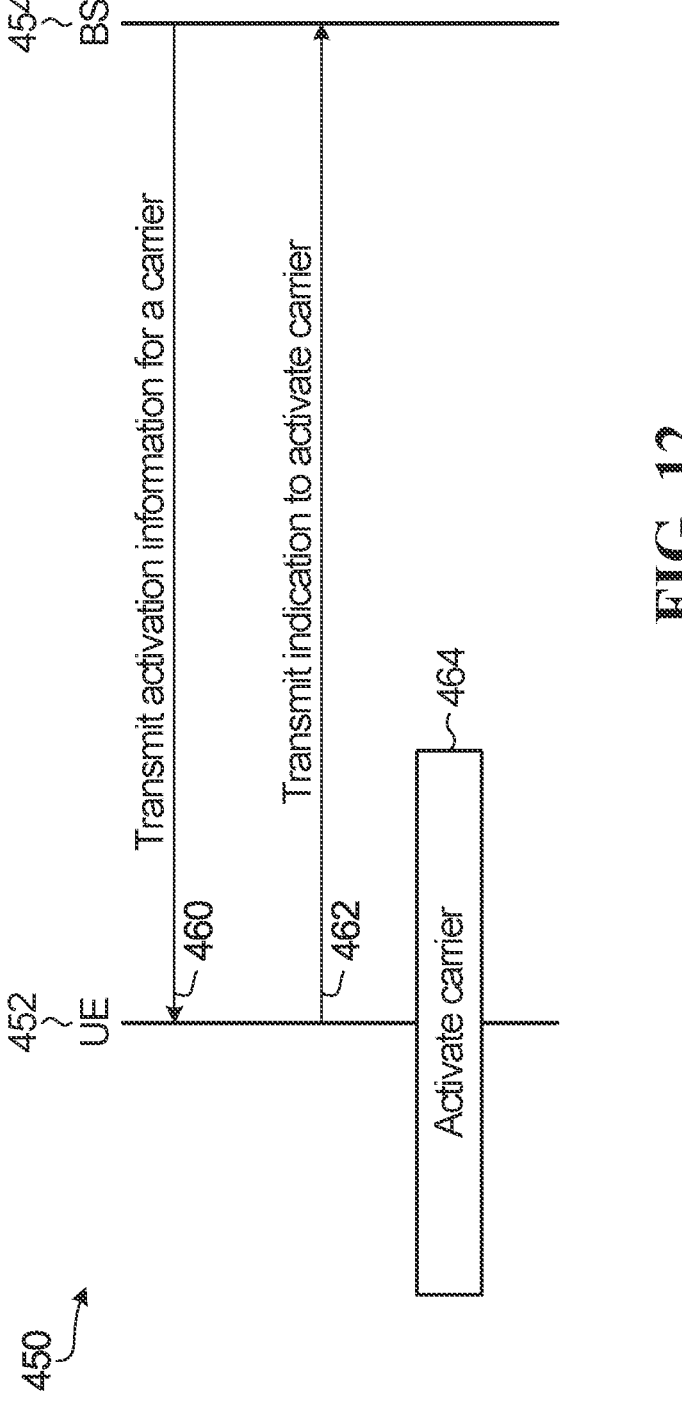
FIG. 12 is a signaling diagram illustrating a process for activating a carrier at a UE, according to an embodiment.

FIG. 12 is a signaling diagram illustrating a process 450 for activating a carrier at a UE 452, according to an embodiment. In step 460, a BS 454 sends activation information for the carrier to the UE 452. RRC signaling, MAC signaling (for example, a MAC CE) and/or DCI may be used to transmit the activation information to the UE 452 in step 460. As discussed in further detail below, the activation information includes synchronization information, beam management information and/or AGC setting information for activating the carrier without the use of an SSB. In some implementations, the activation information transmitted in step 460 pertains to multiple carriers configured at the UE 452. The selection by the BS 454 of which carrier(s) to send activation information for may be based on at least one of the channel quality of a carrier, interference in a carrier, traffic load of a carrier, or coverage of a carrier.

Synchronization information may enable a UE to become synchronized with a carrier. For example, synchronization information may enable the UE to determine the timing of radio frame boundaries and/or symbol boundaries on the carrier for transmission and/or reception of data. Synchronization information may include information for uplink and/or downlink synchronization. In some implementations, the activation information sent in step 460 includes synchronization information for the activating carrier. The synchronization information may identify or otherwise indicate a reference carrier to help provide downlink and/or uplink synchronization for the activating carrier. The reference carrier may be another active and/or configured carrier at the UE 452. In some implementations, before the UE 452 is synchronized to the activating carrier, when the UE 452 is to initially connect with the network (e.g. upon powering on), the UE 452 performs an initial access procedure. The initial access procedure is implementation specific, but may include operations relating to synchronization, decoding and reading the system information, generating a random-access request for transmission, etc. For example, in one implementation: the UE 452 searches for one or more synchronization signals, e.g. a primary synchronization signal (PSS) and a secondary synchronization signal (SSS); the UE 452 decodes a physical broadcast channel (PBCH) to read a master information block (MIB) in order to obtain necessary system information; information in system information blocks (SIBs) are also read; and the UE 452 performs a random access procedure. The random access procedure is sometimes referred to as a random access channel (RACH) procedure and may include: transmission of a preamble (RACH preamble) ("msg1") by UE 452; receipt of a random access response (RAR) ("msg2") from base station 454; transmission of information, such as a RRC connection request ("msg3") by UE 452; and a response to msg3 ("msg4"), e.g. connection confirmation information, from base station 454. The initial access procedure may allow the UE 452 to become synchronized to a carrier. When the UE 452 receives the activation information in step 460 including synchronization information for the activating carrier, this carrier may be identified as a reference carrier in the activation information. Synchronization to the activating carrier may then be performed based on the synchronization to the reference carrier. In some cases, separate reference carriers may be used for downlink and uplink synchronization for the activating carrier. Alternatively or additionally, the synchronization information for the activating carrier may include CSI-RS beam information for synchronizing with the activating carrier. Using the CSI-RS beam information, the UE 452 may measure a CSI-RS beam sent on the activating carrier to become synchronized with the activating carrier.

In some implementations, the activation information sent in step 460 includes beam management information for the activating carrier. Beam management information for the activating carrier may provide the UE 452 with the necessary information and settings to perform beam management on the activating carrier. Performing beam management may enable the UE 452 to transmit and/or receive data using one or more beams on the activating carrier. In some cases, beam management information may allow the UE 452 to determine the amplitude and/or phase weighting at an antenna to form a beam. The beam management information may identify or otherwise indicate a reference carrier for beam management. The UE 452 may then use the same transmitting and/or receiving beams for the activating carrier as for the reference carrier. This reference carrier may be the same as, or different from, a reference carrier used for synchronization. Alternatively or additionally, the beam management information for the activating carrier may directly indicate transmitting and/or receiving beams for the activating carrier. For example, a beam for the activating carrier may be predicted using AI/ML and/or sensing capabilities at the BS 454, and the BS 454 may then indicate the predicted beam to the UE 452 in the activation information. Position or location information for the UE 452 may be used by the BS 454 to help predict the beam. Further, beam management information may also or instead indicate resources for beam training at the UE 452 or at the BS 454. These resources may include downlink beams (such as CSI-RS beams, for example) for receiving beam training at UE 452, and/or uplink beams (such as SRS beams or SRS resources indicators) for receiving beam training at the BS 454.

In some implementations, the activation information sent in step 460 includes AGC setting information for the activating carrier. The AGC setting information may enable the UE 452 to perform AGC setting for the activating carrier. For example, the UE 452 may appropriately adjust the gain applied to signals received on the activating carrier. Using AGC setting information, the UE 452 may amplify the power of signals received over the activating carrier while avoiding saturation of the signals. AGC setting information may include path loss and/or coupling loss information. Path loss is the power loss due to propagation over a wireless channel, and coupling loss is the power loss from a transmitting antenna port to a receiving antenna port. In general, the coupling loss for a carrier includes the path loss. The AGC setting information may identify or otherwise indicate a reference carrier for determining an AGC setting. The UE 452 may then use the same or a similar AGC setting for the activating carrier as the reference carrier. This reference carrier may be the same as, or different from, a reference carrier used for synchronization and/or a reference carrier used for beam management. Alternatively or additionally, AGC setting information for the activating carrier may directly indicate a value of path loss and/or coupling loss in the activating carrier. For example, the path loss and/or coupling loss for the activating carrier may be predicted using AI/ML and/or sensing capabilities at a BS 454. Position or location information for the UE 452 may be used by the BS 454 to help predict the path loss and/or coupling loss. Further, AGC setting information may also or instead indicate resources for measuring path loss and/or coupling loss. An example of such resources is CSI-RS resources, which may be the same CSI-RS resources used for beam training.

In step 462, the BS 454 sends the UE 452 an indication to activate the carrier. The indication to activate the carrier may be a carrier activation command or instruction, for example. In some implementations, step 462 includes the BS 454 sending DCI or a MAC-CE that indicates one or more carrier(s) are activated. For example, the indication may include a bitmap to indicate the carrier(s) that are activated. Each bit in the bitmap may correspond to a respective carrier. When the bit corresponding to a particular carrier is set to "1", then the particular carrier is activated. The selection by the BS 454 of the carrier(s) to be activated may be based on at least one of the channel quality of a carrier, interference in a carrier, traffic load of a carrier, or coverage of a carrier.

The UE 452 uses the activation information obtained in step 460 to complete the activation of the carrier in step 464, allowing the UE 452 to transmit and/or receive data over the carrier. Activating the carrier may include performing synchronization, beam management and/or AGC setting for the carrier.

As illustrated, the activation information is transmitted to the UE 452 before transmitting the indication to activate the carrier. Alternatively, the activation information may be transmitted to the UE 452 after transmitting the indication to activate the carrier. For example, step 462 could be performed before step 460. Further, the activation information and the indication to activate the carrier may be transmitted together in MAC signaling or DCI. For example, steps 460, 462 could be performed together in a single transmission from the BS 454.

Advantageously, the activation information for the carrier transmitted in step 460 may enable the UE 452 to activate the carrier independent of an SSB. In this way, the process 450 may reduce activation delay compared to carrier activation processes that rely on SSB measurements. For example, synchronization, beam management and/or AGC setting may be performed independent of an SSB, and therefore the SSB periodicity defined by a SMTC might not affect carrier activation delay.

It should be noted that the process 450 is not limited to carrier activation. For example, step 462 might also or instead include the BS 454 sending the UE 452 an indication to deactivate a carrier.

Panel Activation

As outlined above, a UE that has multiple active panels may have a higher level of power consumption. Therefore, in some cases, a relatively small number of panels (for example, a single panel) may be active at a UE to conserve power. More panels may then be activated at the UE when needed, such as when a burst of data traffic arrives or is scheduled, for example.

The delay associated with activating a panel may depend on any of a number of different factors. In some cases, the control signaling used to indicate the activation of a panel may contribute to panel activation delay. For example, if a MAC CE is used to indicate the activation of a panel at a UE, then panel activation delay may depend on the MAC CE parsing time. Further, panel activation delay may also or instead depend on the time needed to obtain panel-specific measurement information for a panel and/or on the inherent panel activation capabilities of a UE.

An aspect of the present disclosure relates to reducing and/or mitigating panel activation delay. This may be referred to as "fast panel activation", which may improve throughput at a UE for bursts of large traffic, and thus improve the UE experience. In some embodiments, DCI is used to dynamically indicate the activation of a panel at a UE. The DCI may include separate indications for transmit (i.e., uplink) panels and for receive (i.e., downlink) panels. The DCI may also indicate the scheduled panels within the active panels, for example, the panels that are scheduled for use in data transmission or reception. Further, the DCI may dynamically activate panels for panel-specific measurements.

Figure 13:
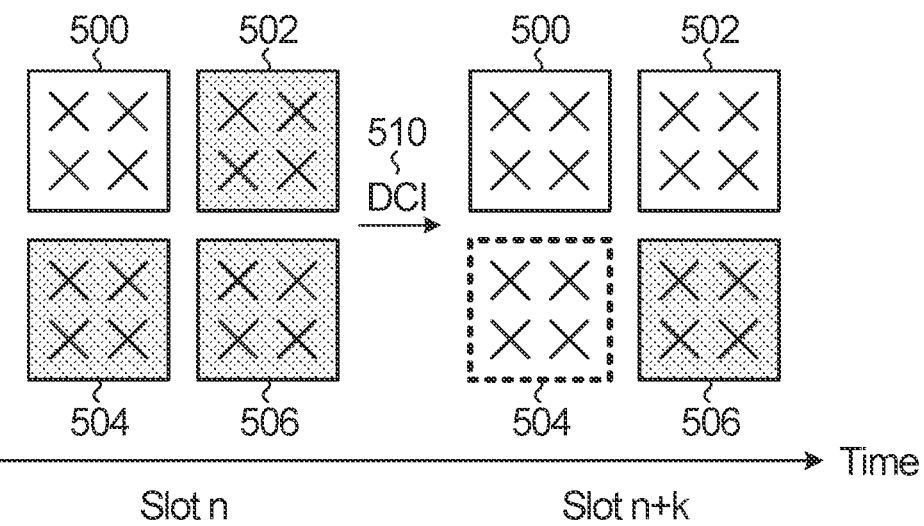
FIG. 13 is a diagram illustrating panel activation at a UE in response to receiving downlink control information (DCI), according to an embodiment.

FIG. 13 is a diagram illustrating panel activation at a UE in response to receiving DCI 510 from a base station, according to an embodiment. FIG. 13 illustrates four panels 500, 502, 504, 506 that are supported by the UE. During an initial or current slot, illustrated as "slot n", only the panel 500 is active at the UE, while the other panels 502, 504, 506 are inactive. Inactive panels are illustrated using speckled shading in FIG. 13.

The DCI 510 is received by the UE and includes an indication that three panels are active. As such, the DCI 510 provides an instruction to activate two additional panels at the UE. In response to the DCI 510, the panels 500, 502, 504 are active in a later slot, illustrated as "slot n+k". These panels may be active for data transmission, data reception, control information transmission, control information reception, and/or panel-specific measurements. The panel 506 remains inactive in slot n+k.

The DCI 510 also indicates that one of the active panels 500, 502, 504 is a scheduled panel for transmitting and/or receiving data. The panel 504 is then scheduled for data transmission and/or reception in slot n+k, which is illustrated using a dashed border in FIG. 13. For example, the panel 504 may be scheduled for performing communications over a physical downlink shared channel (PDSCH) and/or a physical uplink shared channel (PUSCH). In this way, the DCI 510 indicates the active panels 500, 502, 504 and indicates the scheduled panel 504 within those active panels.

DCI may indicate active and/or scheduled panels in any of a number of different ways. According to one example, a bitmap in the DCI may be used to indicate the active panels at a UE, where a bit value equal to 1 indicates that the corresponding panel is activated. Another bitmap in the DCI may be used to indicate the scheduled panels, where bit value equal to 1 means that the corresponding panel is scheduled. Alternatively, scheduled panel indexes may be indicated by a BS in DCI. An active and/or scheduled panel may be selected by a BS based on the channel quality of the panel, including the beam direction.

Figure 14:
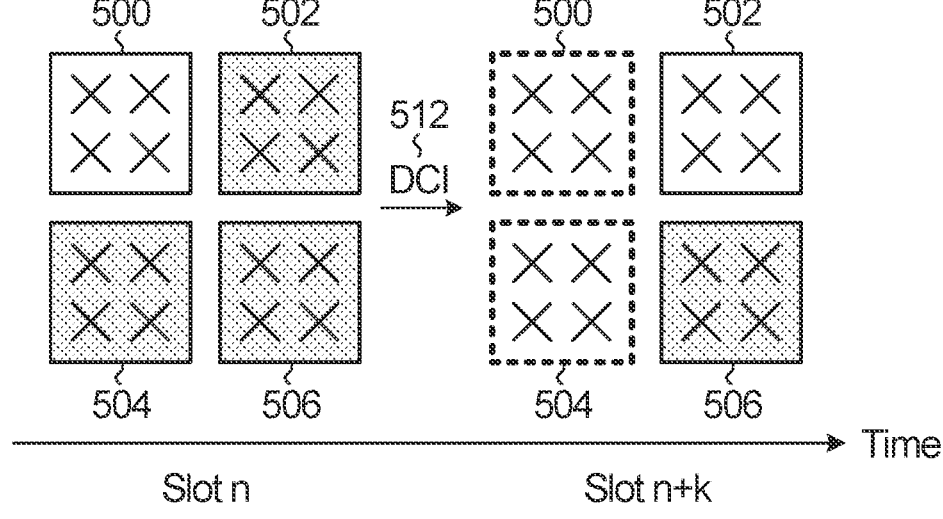
FIG. 14 is a diagram illustrating panel activation at a UE in response to receiving DCI, according to another embodiment.

In some embodiments, multiple active panels may be scheduled for data transmission and/or reception by DCI. FIG. 14 is a diagram illustrating panel activation at the UE in response to receiving DCI 512, according to another embodiment. In slot n, only the panel 500 of the UE is active. The DCI 512 then indicates that three panels are active at the UE and two of the three panels are for transmitting and/or receiving data. In response to receiving the DCI 512, the panels 500, 502, 504 are activated at the UE in slot n+k, and the panels 500, 504 are scheduled for transmitting and/or receiving data. In some implementations, the DCI 512 may be sent when the UE is required to generate two different beams for transmission and/or reception. A BS may therefore transmit the DCI 512 to schedule the panels 500, 504 to support the different beams.

While FIGS. 13 and 14 illustrate examples of DCI being used to activate panels at a UE (i.e., increasing the number of active panels at the UE), it should be noted that panel deactivation is also contemplated. For example, following slot n+k, the UE could receive further DCI that indicates less than three panels are active, and in response one or more of the panels 500, 502, 504 may be deactivated.

In some implementations, the activation and scheduling of the panels 500, 502, 504 shown in FIGS. 13 and 14 is specific to data reception (i.e., downlink communications) or to data transmission (i.e., uplink communications). By way of example, the DCI 510, 512 may be used to indicate the active panels and scheduled panels for uplink communication at the UE, and separate DCI may be used to indicate the active panels and scheduled panels for downlink communication at the UE. The separate DCI may be sent in a separate physical downlink control channel (PDCCH) transmission. In another example, the DCI 510, 512 may be used to indicate the active panels and scheduled panels for downlink communication at the UE, and separate DCI may be used to indicate the active panels and scheduled panels for uplink communication at the UE. In some implementations, two fields of the DCI 510, 512 may indicate the active/scheduled panels for uplink and downlink communication at the UE, which may be sent in one PDCCH transmission.

In some implementations, the DCI 510, 512 indicates the receiving and/or transmitting beam for each scheduled panel. For example, the DCI 510 may indicate the beam used by the scheduled panel 504 in FIG. 13 for data transmission and/or reception. The scheduled panel 504 and a corresponding beam may be jointly indicated by the DCI 510. By way of example, beam management information (such as a CSI-RS or an SRS resource) in the DCI 510 may include a panel identifier (ID) for the panel 504. As such, when the UE obtains this beam management information from the DCI 510, then UE may implicitly determine that the panel 504 is the scheduled panel for the beam.

In some embodiments, panel activation and/or deactivation signaling may be cross-carrier indicated. For example, either of both of the DCI 510, 512 may be transmitted on a different carrier than the panels 500, 502, 504, 506 are configured for.

As noted above, panel activation at a UE may have an associated delay that is inherent to the UE. For example, after receiving an indication to activate a panel, the UE may require a certain amount of time to complete the activation of the panel. Panel activation delay may be UE-dependent. In some cases, panel activation delay may depend on the number of activated panels and/or the number of scheduled panels at a UE. For example, increasing the number of panels that are activated and/or scheduled at the UE may also increase the time to complete the activation of the panels. However, activation delay might not always depend on the number of activated and/or scheduled panels, and might instead be independent of the number of activated and/or scheduled panels.

In some embodiments, in order to accommodate panel activation delay that is inherent to the UE, a minimum timing gap is implemented between DCI and scheduled communications (for example, a scheduled communication on the PDSCH or the PUSCH). The minimum timing gap may be the same as, or larger than, the panel activation delay. Further, the timing interval between the DCI and the scheduled communications may be equal to or larger than the minimum timing gap. By way of example, referring to FIGS. 13 and 14, the value of k may represent the timing interval between receiving the DCI 510, 512 and scheduled communications. The value of k be configured based on the minimum timing gap for the UE. The value of k may be greater than or equal to the minimum timing gap, which helps ensure that the scheduled panels (i.e., panel 504 in FIG. 13 and panels 500, 504 in FIG. 14) are completely activated and are able to transmit and/or receive data in slot n+k.

Advantageously, DCI may dynamically indicate activated and scheduled panels when bursts of traffic are received. Panels may therefore be rapidly activated and scheduled as needed, which may reduce panel activation delay. For example, the use of the DCI to activate a panel may avoid the use of a MAC CE and may therefore reduce the panel activation delay related to MAC CE parsing time. DCI may also or instead dynamically indicate the deactivation of panels, which may reduce the time that panels are unnecessarily active and may therefore reduce power consumption at a UE. Further, DCI may dynamically activate panels for measurements, which may reduce the activation delay associated with obtaining panel-specific measurement information.

Dynamic Panel-Specific Measurements

As noted above, performing panel-specific measurements may contribute to panel activation delay. Consider, for example, a UE that supports multiple panels but only has a small number of those panels (for example, a single panel) active at a particular time to conserve power. The non-active panels at the UE may be later activated to accommodate a burst of data traffic. To activate one or more of the inactive panels, the UE and a BS may need to know panel-specific measurement information for each of the activating panels. If this information is not already known when initiating the activation of a panel, then the time needed to obtain the panel-specific measurement information may contribute to panel activation delay.

An aspect of the present disclosure relates to obtaining panel-specific measurement information in advance of panel activation. This may avoid performing panel-specific measurements after initiating or determining the activation of a panel, and may therefore reduce panel activation delay. In this way, obtaining panel-specific measurement information in advance of panel activation may enable a BS to quickly activate and schedule inactive panels at a UE. The panel-specific measurement information may be obtained in a power efficient manner in order to conserve power at the UE.

In some embodiments, an RF round robin is implemented to perform panel-specific measurements on multiple panels. Non-limiting examples of such panel-specific measurements include CSI measurements and beam measurements corresponding to a panel. During an RF round robin measurement process, a UE may activate multiple panels according to a particular pattern to obtain panel-specific measurement information for each panel, which may help enable fast panel activation.

Figure 15:
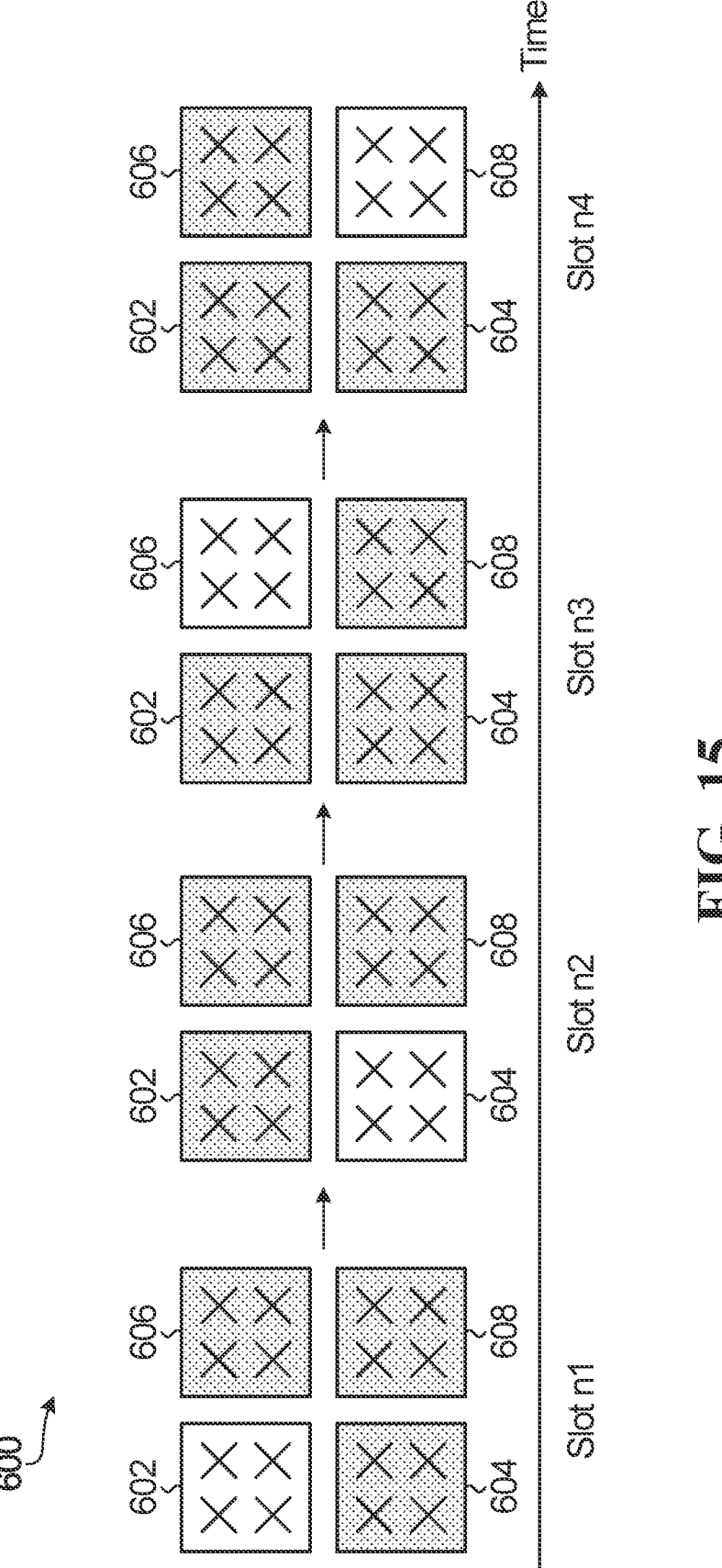
FIG. 15 illustrates a round robin pattern for obtaining panel-specific measurement information, according to an embodiment.

FIG. 15 illustrates a round robin pattern 600 for obtaining panel-specific measurement information, according to an embodiment. The round robin pattern 600 is an example of a dynamic panel activation/deactivation time pattern or a dynamic panel on/off time pattern for performing panel-specific measurements. The round robin pattern 600 involves four panels 602, 604, 606, 608 at a UE, but other numbers of panels at the UE are also contemplated. The round robin pattern 600 also involves four slots, labelled as slots n1, n2, n3 and n4. However, slots are only an example of a time unit in which a round robin pattern may be implemented. Others time units are also contemplated, including symbols, multiple symbols and mini-slots, for example.

In each of slots n1, n2, n3 and n4, one of the panels 602, 604, 606, 608 is activated (i.e., turned on) for a panel specific measurement. The inactive panels in each slot are shown with speckled shading and the active panel in each slot is shown without speckled shading. As illustrated, in slot n1 the panel 602 is active and the other panels 604, 606, 608 are inactive. Measurements such as CSI measurements and/or beam measurements, for example, may be performed by the panel 602 in slot n1 to obtain panel-specific measurement information pertaining to the panel 602. For example, a reference signal and/or a synchronization signal may be transmitted and/or received by the UE using the panel 602 in slot n1. After slot n1, the panel 602 is deactivated (i.e., turned off) to conserve power at the UE. For example, the panel 602 might not be required for data transmission during slots n2, n3 and n4.

Similar comments apply to the other slots n2, n3 and n4 in the round robin pattern 600. In slot n2, the panel 604 is active to obtain corresponding panel-specific measurement information, while the panels 602, 606, 608 are inactive. In slot n3, the panel 606 is active to obtain corresponding panel-specific measurement information, while the panels 602, 604, 608 are inactive. In slot n4, the panel 608 is active to obtain corresponding panel-specific measurement information, while the panels 602, 604, 606 are inactive.

Using the round robin pattern 600, panel-specific measurement information may be obtained for each of the panels 602, 604, 606, 608. The panel-specific measurement information could allow any, one, some or all of the panels 602, 604, 606, 608 to be rapidly activated to increase the data transmission rate at the UE. In this way, implementing the round robin pattern 600 may decrease a delay for panel activation and scheduling at the UE. This may improve throughput for the UE in the event of a large burst of data traffic.

The round robin pattern 600 may be implemented by RF chain switching between each of the panels 602, 604, 606, 608. RF chain switching is discussed in further detail elsewhere herein. In some implementations, an RF chain is switched between each of the panels 602, 604, 606, 608 according to the round robin pattern 600. For example, the UE may switch the RF chain to the panel 602 to perform the panel-specific measurement in slot n1. The UE may then switch the RF chain to the panels 604, 606, 608 in slots n2, n3 and n4, respectively, to perform panel-specific measurements on these panels. Switching the RF chain to a panel may activate (i.e., turn on) that panel while deactivating (i.e., turning off) another panel. For example, when switching the RF chain from the panel 602 to the panel 604 between slot n1 and slot n2, the panel 602 may be deactivated and the panel 604 may be activated.

Alternatively or additionally, the round robin pattern 600 may be implemented by turning RF chains on and off. For example, each of the panels 602, 604, 606, 608 may have a corresponding RF chain. The UE may turn on the RF chain corresponding to the panel 602 in slot n1, which may activate the panel 602. In slot n2, the UE may turn off the RF chain corresponding to the panel 602 to deactivate the panel 602, and turn on the RF chain corresponding to the panel 604 to activate the panel 604. Similar comments apply to activating the panels 606, 608 in slots n3 and n4.

In some implementations, the round robin pattern 600 may be indicated to the UE by a BS through control signaling, for example. The BS may configure the round robin pattern 600 (for example, the order in which the panels 602, 604, 606, 608 are activated) and the activation period for each of the panels 602, 604, 606, 608 (for example, the timing of the slots n1, n2, n3 and n4). The BS may also configure one or more times for implementing the round robin pattern 600. For example, the round robin pattern 600 may be configured as periodic, aperiodic, or semi-persistent for the UE.

Dynamic Carrier-Specific Measurements

Another aspect of the present disclosure relates to obtaining carrier-specific measurement information in advance of performing RRM. For example, carrier-specific measurement information may be obtained in advance of activating a carrier, and may reduce the activation delay for the carrier. In some embodiments, an RF round robin measurement process is configured for a UE to obtain measurement information for multiple inactive carriers. Non-limiting examples of such measurement information include CSI, information for synchronization, information for beam management and information for AGC setting. During an RF round robin measurement process, a UE may dynamically activate, deactivate and/or switch between multiple inactive carriers according to a particular pattern to obtain measurement information for each carrier. This RF round robin measurement process may avoid a UE and/or a BS having to obtain carrier-specific measurement information after initiating the activation of a carrier, and may therefore reduce carrier activation delay. As such, a RF round robin measurement process may help enable fast carrier activation.

Figure 16:
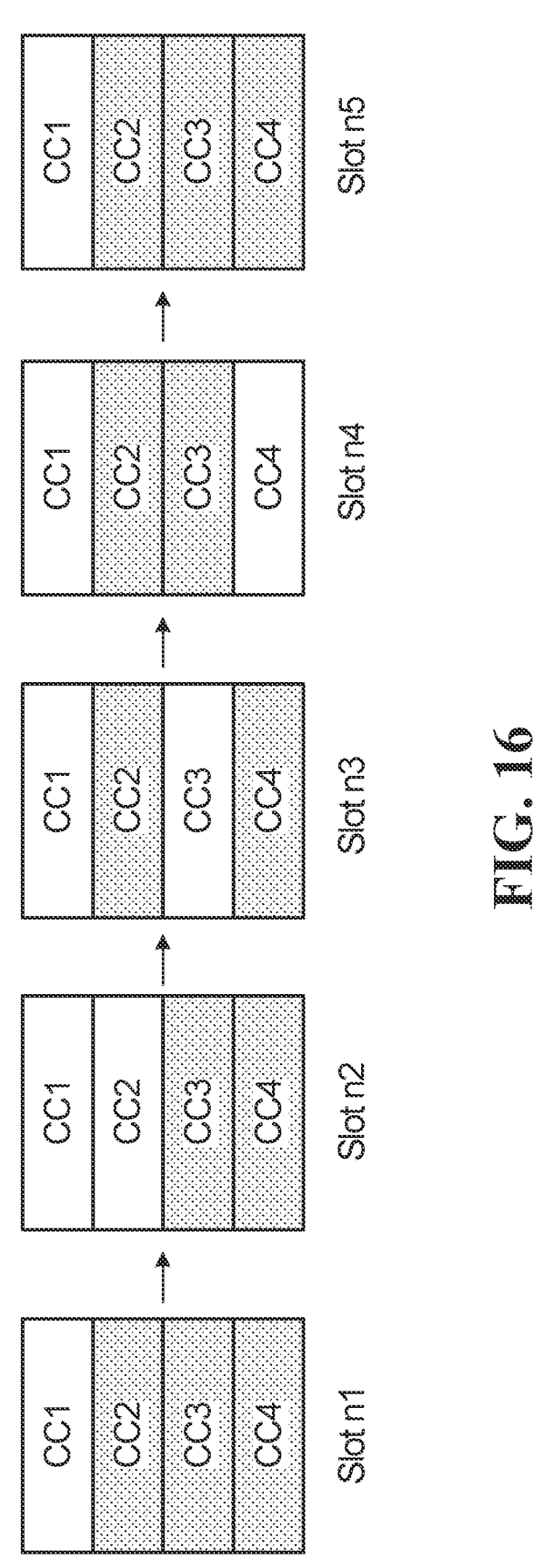
FIG. 16 illustrates a round robin pattern for obtaining carrier-specific measurement information, according to an embodiment.

FIG. 16 illustrates a round robin pattern 700 for obtaining carrier-specific measurement information, according to an embodiment. The round robin pattern 700 is an example of a dynamic carrier activation/deactivation time pattern or a dynamic carrier on/off time pattern. The round robin pattern 700 involves four carriers configured for a UE, which are labeled as CC1, CC2, CC3 and CC4. CC1 is active for data transmission to and/or from the UE during the round robin pattern 700, whereas CC2, CC3 and CC4 are inactive for data transmission. Other numbers of configured carriers at the UE are also contemplated. The round robin pattern 700 also involves five slots, labelled as slot n1, n2, n3, n4 and n5. In each slot n1, n2, n3, n4 and n5, the inactive carriers are shown with speckled shading and the active carrier(s) in each slot is/are shown without speckled shading. As noted above, slots are only one non-limiting example of a time unit in which a round robin pattern may be implemented.

Slot n1 may represent the start of the round robin pattern 700. As illustrated, CC1 is active in slot n1 and CC2, CC3 and CC4 are inactive. Data may be transmitted to and/or from the UE on CC1 in slot n1.

CC2, CC3 and CC4 are sequentially activated in slots n2, n3 and n4 to obtain corresponding measurement information for CC2, CC3 and CC4. In slot n2, CC2 is activated to obtain measurement information for CC2. For example, a reference signal and/or a synchronization signal may be transmitted and/or received by the UE on CC2. The measurement information obtained for CC2 may include CSI, information for synchronization, information for beam management and/or information for AGC setting, for example. CC1 remains active in slot n2, which may be because the UE is transmitting and/or receiving data over CC1 in slot n2, for example. After slot n2, CC2 is deactivated to conserve power at the UE. For example, CC2 might not be required for data transmission during slots n3, n4 and n5. Similar comments apply to slots n3 and n4. In slot n3, CC3 is activated to obtain corresponding measurement information. CC1 one is also active in slot n3, while CC2 and CC4 are inactive. In slot n4, CC4 is activated to obtain measurement information for CC4. CC1 one is also active in slot n4, while CC2 and CC3 are inactive.

Slot n5 may represent the end of the round robin pattern 700. For example, the UE may return to a previous RRM state (i.e., with only CC1 active) in slot n5. CC1 may be active in slot n5 for transmitting and/or receiving data, while CC2, CC3 and CC4 may be deactivated in slot n5 to conserve power at the UE.

In some implementations, slots n1 and n5 might not be considered part of the round robin pattern 700. In these implementations, the round robin pattern 700 might only include the slots n2, n3 and n4 to obtain measurement information for CC2, CC3 and CC4, where CC1 is active for data transmission.

Using the round robin pattern 700, measurement information may be obtained for CC2, CC3 and CC4. This measurement information could allow any, one some or all of CC2, CC3 or CC4 to be rapidly activated to increase the data transmission rate at the UE. Further, the UE may be able to rapidly switch between CC1, CC2, CC3 and CC4. In this way, implementing the round robin pattern 700 may decrease a delay for carrier activation, switching and scheduling at the UE. This may improve data throughput for the UE in the event of a large burst of data traffic, for example.

In some implementations, the round robin pattern 700 may be dynamically and/or semi-statically configured by a BS using control signaling, for example. Alternatively, the round robin pattern 700 may be predefined at the UE.

A UE may have an inherent carrier activation delay that is dependent on the RF capabilities of the UE. This inherent carrier activation delay may be accounted for in a round robin pattern. In some implementations, the amount of time allotted for switching between carriers in the round robin pattern 700 may be configured based on the RF capabilities of the UE. For example, the round robin pattern 700 may account for the amount of time that the UE requires to activate a carrier (for example, due to the UE's inherent carrier activation delay). The amount of time that the UE requires to activate a carrier may or may not depend on the number of active carriers at the UE.

Flexible Uplink Measurement Switching

An aspect of the present disclosure relates to flexible uplink measurement switching, which may include but is not limited to switching Tx RFs/antennas between different uplink carriers for performing uplink measurements. In some embodiments, flexible uplink measurement switching is implemented to perform SRS measurements for multiple Tx RFs/antennas. The flexible uplink measurement switching may enable uplink measurement information to be obtained in advance of scheduling transmissions on the uplink and/or on the downlink.

As used herein, a carrier that one or more Tx RFs/antennas are switched from is referred to as a "switch-from carrier", and a carrier that one or more Tx RFs/antennas are switched to is referred to as a "switch-to carrier". The switching of a RF/antenna between carriers may be performed using RF/antenna switching.

In some embodiments, a BS may indicate uplink measurement switching of Tx RFs/antennas between different configured and/or active carriers at a UE. The indication may be transmitted to the UE through RRC signaling or DCI. Alternatively, the indication may be preconfigured at the UE. The BS may indicate any, some or all of the following information to the UE: the IDs of one or more switch-from carriers; the number of switched Tx RFs/antennas for each switch-from carrier; and the IDs of one or more switch-to carriers.

Figure 17:
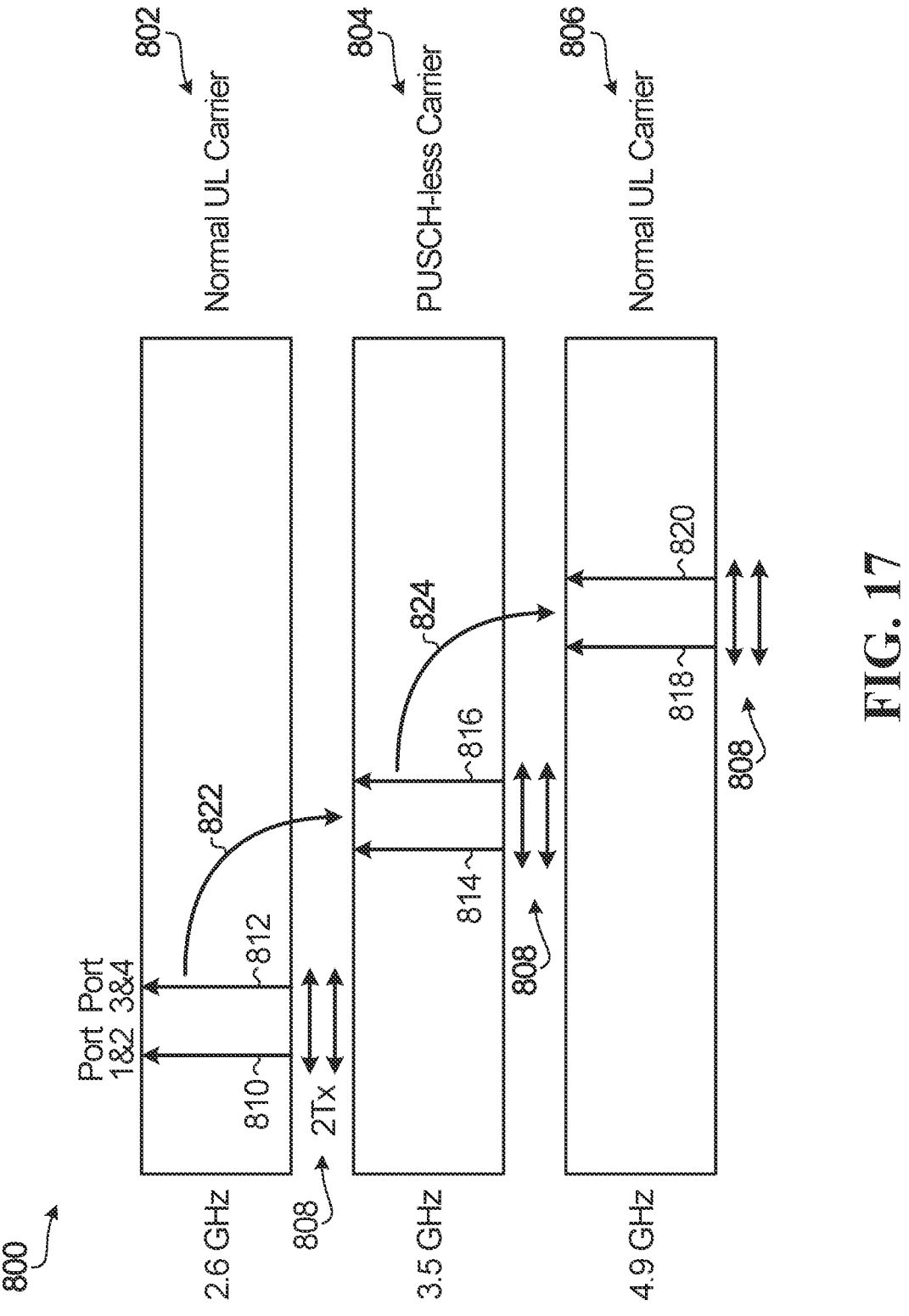
FIG. 17 illustrates a time-frequency resource configuration for flexible uplink measurement switching at a UE, according to an embodiment.

FIG. 17 illustrates a time-frequency resource configuration 800 for flexible uplink measurement switching at a UE, according to an embodiment. The UE has two Tx RFs/antennas, which are indicated at 808 in FIG. 17, and four Rx RFs/antennas. The UE is also configured with three uplink carriers 802, 804, 806. The carrier 802 is a normal uplink carrier supporting PUSCH transmissions and SRS transmissions, and has a reference frequency of 2.6 GHz. The carrier 804 is a PUSCH-less uplink carrier that is only for uplink measurements (for example, only for SRS transmissions) and has a reference frequency of 3.5 GHz. The carrier 806 is another normal uplink carrier supporting PUSCH transmissions and SRS transmissions, and has a reference frequency of 4.9 GHz.

CSI may be obtained for downlink scheduling between a BS and the four Rx RFs/antennas at the UE. In this example, the BS has four antenna ports, which are referred to as ports 1, 2, 3 and 4. The CSI may be obtained by SRS reception at the four ports of the BS. The time-frequency resource configuration 800 illustrates multiple SRS transmissions 810, 812, 814, 816, 818, 820 from the UE to the BS, which are each sent in different slots of the time-frequency resource configuration 800. The SRS transmissions 810, 812 are sent over the carrier 802, the SRS transmissions 814, 816 are sent over the carrier 804, and the SRS transmissions 818, 820 are sent over the carrier 806. It should be noted that slots are only one example of an SRS time unit. Other SRS time units may be implemented in flexible uplink measurement switching, including symbols, multiple symbols and mini-slots, for example.

Each of the SRS transmissions 810, 812, 814, 816, 818, 820 are sent by both Tx RFs/antennas 808 of the UE. For example, the SRS transmissions 810 include two separate SRS transmissions, each SRS transmission being sent by a respective one of the Tx RFs/antennas 808. The four antenna ports of the BS are configured for receiving the SRS transmissions 810, 812, 814, 816, 818, 820. For example, the SRS transmissions 810, 814, 818 are received by ports 1 and 2 of the BS, and the SRS transmissions 812, 816, 820 are received by ports 3 and 4 of the BS. In a given slot, the SRS transmission from each of the Tx RFs/antennas 808 is received by a different antenna port at the BS. For example, in the SRS transmissions 810, the SRS transmission from one of the Tx RFs/antennas 808 is received by port 1 of the BS, and the SRS transmissions from the other of the Tx RFs/antennas 808 is received by port 2 of the BS. This allows uplink measurement information for each antenna port at the BS to be obtained on the carriers 802, 804, 806.

To perform the SRS transmissions 810, 812, 814, 816, 818, 820, the two Tx RFs/antennas 808 at the UE are dynamically switched between the three carriers 802, 804, 806. For example, as indicated at 822, the two Tx RFs/antennas 808 are switched from carrier 802 to carrier 804 and, as indicated at 824, the two Tx RFs/antennas 808 are switched from carrier 804 to carrier 806. The switching at 822, 824 is an example of flexible uplink measurement switching of the Tx RFs/antennas 808 between the carriers 802, 804, 806.

The switching at 822, 824 may have been configured by the BS through RRC signaling or DCI. For example, the BS may have indicated the switch-from carriers (i.e., the carriers 802, 804), the switch-to carriers (i.e., the carriers 804, 806), the number of switched Tx RFs/antennas (i.e., both of the Tx RFs/antennas 808), the order of the switch-to carriers, and the time for switching. In this way, the time-frequency resource configuration 800 illustrates an example of switching multiple Tx RFs/antennas for SRS uplink measurements. As noted above, this may provide fast SRS switching to obtain uplink channel information.

In some embodiments, the BS instructs a UE to switch all active Tx RFs/antennas, which may be on multiple different carriers, to a single carrier.

Figure 18:
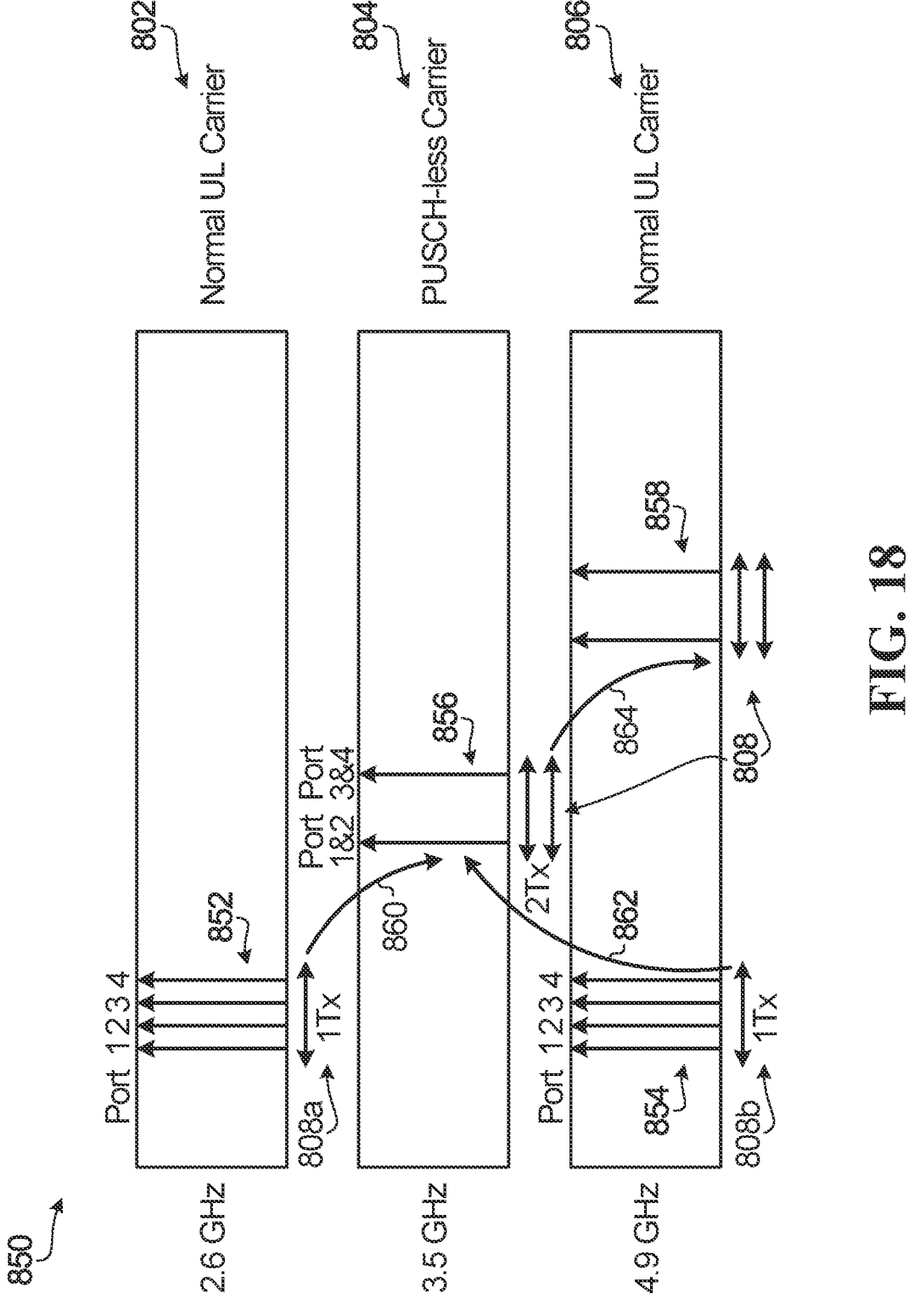
FIG. 18 illustrates a time-frequency resource configuration for flexible uplink measurement switching at a UE, according to another embodiment.

FIG. 18 illustrates another time-frequency resource configuration 850 for flexible uplink measurement switching at the UE of FIG. 17, according to another embodiment. The time-frequency resource configuration 850 illustrates multiple SRS transmissions 852, 854, 856, 858 from the UE to the BS having four antenna ports. The SRS transmissions 852 include four SRS transmissions that are sent over four different slots on the carrier 802 and that are received by the four antenna ports at the BS, respectively. One RF/antenna (indicated at 808a) of the Tx RFs/antennas 808 transmits each of the SRS transmissions 852. The SRS transmissions 854 are transmitted by another Tx RF/antenna (indicated at 808b) of the RFs/antennas 808. The SRS transmissions 854 are sent over four different slots on the carrier 806 and are received by the four antenna ports at the BS, respectively.

The Tx RF/antenna 808a is switched at 860 from the carrier 802 to the carrier 804. The Tx RF/antenna 808b is also switched at 862 from the carrier 806 to the carrier 804. This switching at 860, 862 provides an example of switching multiple RFs/antennas from multiple carriers to a single carrier. The two Tx RFs/antennas 808 then perform the SRS transmissions 856 in two slots on the carrier 804. Each the antenna ports at the BS receives one of the SRS transmissions 856 from one of the Tx RFs/antennas 808. After the SRS transmissions 856, the Tx RFs/antennas 808 are switched at 864 to the carrier 806. The Tx RFs/antennas 808 send SRS transmissions 858 in two slots on the carrier 806, which are received by the four antenna ports of the BS. The time-frequency resource configuration 850 allows uplink measurement information for each antenna port at the BS to be obtained on the carriers 802, 804, 806.

Advantageously, switching Tx RFs/antennas from multiple carriers may provide fast SRS switching to obtain uplink channel information. The SRS transmissions 856 are examples of fast SRS transmissions. For example, only two slots in the time-domain are required to perform the SRS transmission 856. In each slot, the UE uses both of the RFs/antennas 808 for an SRS transmission. In contrast, four slots in the time-domain are required for the SRS transmissions 852. Therefore, by switching both the of the RS/antennas 808 to the carrier 804, uplink channel information for the carrier 804 may be obtained more rapidly, which may reduce activation delay for the carrier 804 in some implementations.

The switching at 860, 862, 864 may have been indicated by the BS through RRC signal or DCI, and may be implemented through RF/antenna switching. By way of example, for the switching at 860, 862, the BS may have indicated the switch-from carriers (i.e., the carriers 802, 806), the switch-to carrier (i.e., the carrier 804), the number of switched Tx RFs/antennas (i.e., both of the Tx RFs/antennas 808), and the time for switching.

Dynamic RF/Antenna Switching

An aspect of the present disclosure relates to dynamic RF/antenna switching among configured and/or active carriers at a UE. This dynamic RF/antenna switching may provide improved data throughput at the UE. In contrast, conventional wireless communication schemes, including 4G and 5G schemes, do not support or otherwise contemplate dynamic Tx/Rx RF/antenna switching. For example, 5G only supports semi-static RF/antenna switching between carriers.

Dynamic Tx/Rx RF/antenna switching may be implemented when a UE has multiple Tx/Rx RFs/antennas and has multiple configured and/or active carriers. For example, the UE may be capable of and/or be implementing CA and/or DC. If one of the configured and/or active carriers is performing better than the other carriers in terms of data transmission rate, data coverage and/or transmission delay, then dynamically switching any, one, some or all of the Tx/Rx RFs/antennas to the best performing carrier might improve data throughput, enhance coverage and/or reduce delay at the UE. For example, one of the configured and/or active carriers might exhibit an improved RSRP, RSRQ and/or SINR compared to the other configured and/or active carriers, which could provide an increased rate of data transmission.

A BS may indicate the dynamic switching of one or more RFs/antennas from one or more carriers to an indicated carrier, which may be the best performing carrier. For example, the BS may indicate one or more switch-from carrier IDs, the RFs/antennas to be switched, and a switch-to carrier ID. Based on the indication from the BS, the UE may switch only a Tx RF/antenna at the UE, switch only a Rx RF/antenna at the UE, or simultaneously switch a Tx RF/antenna and Rx RF/antenna. The indication may be transmitted from the BS to the UE using DCI, a MAC-CE and/or RRC signaling, for example.

Figure 19:
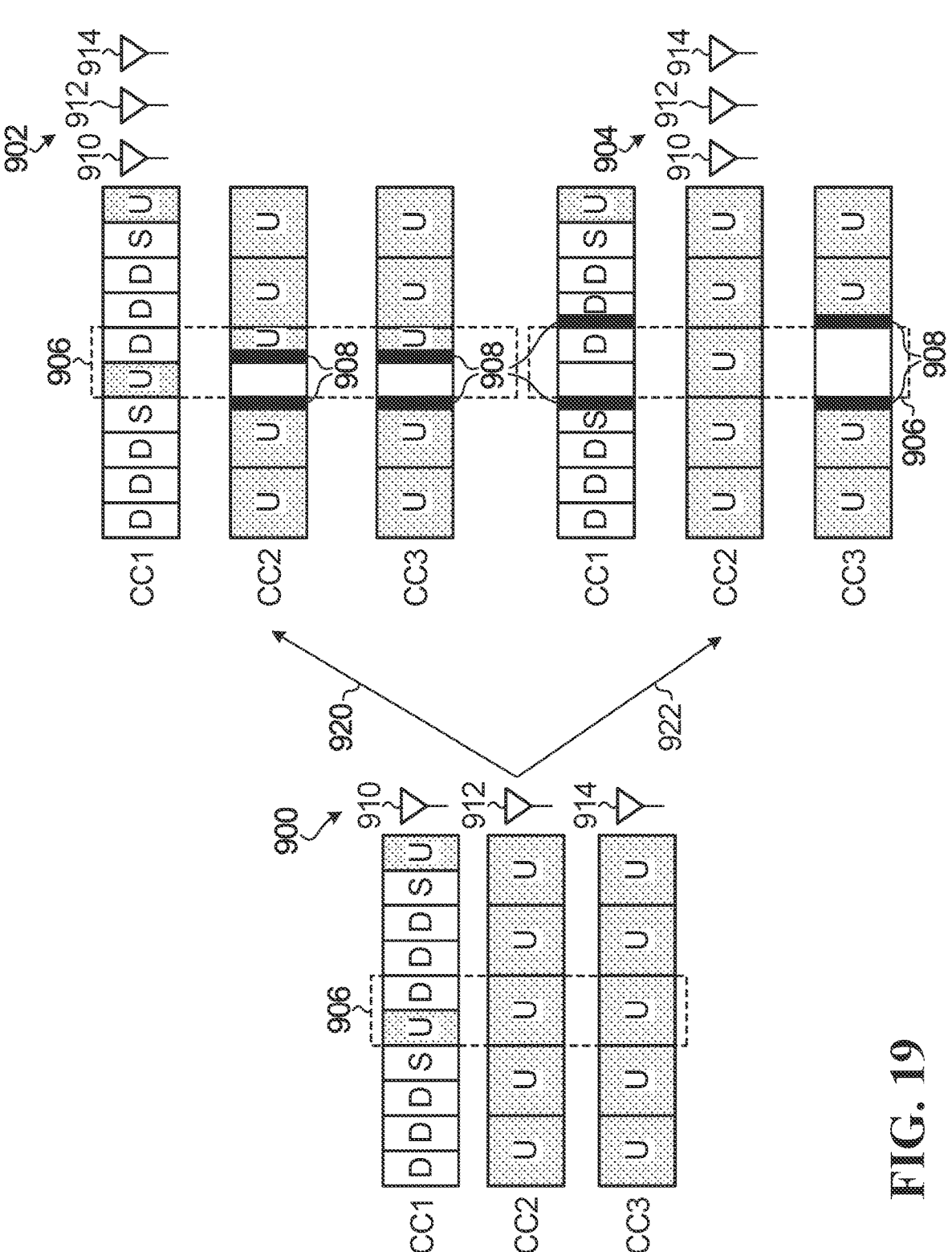
FIG. 19 is a diagram illustrating dynamic RF/antenna switching between multiple active carriers at a UE, according to an embodiment.

FIG. 19 is a diagram illustrating dynamic RF/antenna switching between multiple active carriers at a UE, according to an embodiment. The multiple active carriers are labelled as "CC1", "CC2" and "CC3". The UE also has three Tx antennas indicated at 910, 912, 914. CC2 and CC3 include only uplink symbols, which are labelled using the letter "U". CC1 includes a combination of uplink symbols, downlink symbols (which are labelled using the letter "D") and sidelink symbols (which are labelled using the letter "S"). In the illustrated example, the symbol length for CC1 is generally half of the symbol length for CC2 and CC3. At least some of the uplink symbols are utilized by one or more of the antennas 910, 912, 914 for uplink transmissions, which is illustrated using speckled shading in FIG. 19.

FIG. 19 illustrates a preconfigured or original antenna configuration 900 for CC1, CC2 and CC3 at the UE. In the antenna configuration 900, the antenna 910 is transmitting on CC1, the antenna 912 is transmitting on CC2 and the antenna 914 is transmitting on CC3. This is the case for all symbols in CC1, CC2 and CC3, including the symbols in a time period indicated at 906. In this way, CC1, CC2 and CC3 may be considered the original carriers of the antennas 910, 912, 914, respectively.

In some cases, one of CC1, CC2 or CC3 may be performing better than the others. For example, the rate of data transmission on one of CC1, CC2 or CC3 might be higher than the others. In these cases, the antenna configuration 900 might not provide a high rate of data transmission at the UE. The rate of data transmission may be improved by switching one of more of the antennas 910, 912, 914 to the best performing carrier. Dynamic RF/antenna switching may therefore be implemented by the UE to switch the antennas 910, 912, 914 between CC1, CC2 and CC3 to improve data throughput at the UE.

FIG. 19 illustrates a switched antenna configuration 902 for CC1, CC2 and CC3 during the time period 906. To achieve the antenna configuration 902, the antennas 912, 914 are dynamically switched from CC2 and CC3, respectively, to CC1 for the time period 906. In this example, CC1 might be performing better than CC2 and CC3 in terms of data throughput, coverage and/or delay, for example. The time period 906 generally corresponds to one uplink symbol on CC2 and CC3 and to one uplink symbol and one downlink symbol on CC1. In order to better utilize the uplink symbol on CC1 during the time period 906, the antennas 912, 914 are switched to transmit on CC1 during the time period 906. All three of the antennas 910, 912, 914 may then transmit during the uplink symbol on CC1, which might result in improved data throughput, enhanced coverage and/or reduced delay. After transmitting on CC1 for one symbol, the antennas 912, 914 are switched back to CC2 and CC3, respectively.

In some implementations, a BS indicates dynamic RF/antenna switching from the antenna configuration 900 to the antenna configuration 902. For example, the UE may receive an indication (which is generally shown at 920) to perform Tx RF/antenna switching to achieve the antenna configuration 902. The indication 920 may be received from the BS through DCI, a MAC-CE and/or RRC signaling. The indication 920 may identify CC2 and CC3 as switch-from carriers, and identify CC1 as a switch-to carrier. The indication 920 may also or instead identify the antennas 912, 914 to be switched.

FIG. 19 also illustrates another switched antenna configuration 904 for CC1, CC2 and CC3 during the time period 906. For example, if CC2 is performing better than CC1 and CC3, then the BS might instead transmit an indication (which is generally shown at 922) of Tx RF/antenna switching to achieve the antenna configuration 904. The indication 922 may configure the UE to switch the antennas 910, 914 from CC1 and CC3, respectively, to CC2 in order to utilize the improved performance of CC2 during the time period 906. After transmitting on CC2 for one uplink symbol, the antennas 910, 914 are switching back to CC1 and CC3, respectively. The indication 922 may identify CC1 and CC3 as switch-from carriers, and identify CC2 as a switch-to carrier. The indication 922 may also or instead identify the antennas 910, 914 to be switched.

The antenna configurations 902, 904 are only maintained for the time period 906. Following the time period 906, the antenna configurations 902, 904 are switched back to the antenna configuration 900. For example, following the time period 906 in the antenna configuration 902, the antenna 912 is switched back to CC2 and the antenna 914 is switched back to CC3. Similarly, following the time period 906 in the antenna configuration 904, the antenna 910 is switched back to CC1 and the antenna 914 is switched back to CC3.

Determining when the antennas 910, 912, 914 should be switched back to the antenna configuration 900 from one of the antenna configurations 902, 904 could be performed in any of a number of different ways. In some implementations, there is no preconfigured time for switching back to the antenna configuration 900. For example, the indications 920, 922 may include the switch-from carrier IDs, the switch-to carrier ID and a time for performing the Tx RF/antenna switching (i.e., the start of the time period 906). However, a time for switching back to the antenna configuration 900 might not be included in the indications 920, 922. Rather, the BS may send the UE a further indication to switch back to the antenna configuration 900. The further indication may include the switch-from carrier ID, the switch-to carrier IDs, the antennas to be switched and a time for performing the Tx RF/antenna switching. For example, when the UE is the antenna configuration 902, the further indication may identify CC1 as the switch-from carrier, the antenna 912 as a carrier to be switched, CC2 as the switch-to carrier, and the time for switching to be immediately after the uplink carrier on CC1 in the time period 906. The further dynamic configuration could be sent in DCI, a MAC-CE and/or RRC signaling.

In some implementations, a time for switching back to the antenna configuration 900 may be included in one or both of the indications 920, 922. For example, in the case of the antenna configuration 902, the indication 920 may inform the UE that the end of uplink symbol on CC1 in the time period 906 is the time for switching back to the antenna configuration 900. Alternatively, the time for switching back might be included in another indication (i.e., different from the indication 920) that may be sent to the UE in further DCI, a further MAC-CE and/or further RRC signaling.

In some implementations, predefined rules specify the time for switching back to the antenna configuration 900. For example, the UE may be preconfigured with a rule specifying that after data transmission in one symbol of a switch-to carrier, an antenna is switched back to an original carrier. Alternatively, the UE may be preconfigured with a rule specifying that after data transmission in one slot of a switch-to carrier, an antenna is switched back to an original carrier.

As illustrated using solid boxes in FIG. 19, the antenna configurations 902, 904 are each associated with a switching period 908 within the switch-from carriers. For example, with regard to the antenna configuration 902, the switching period 908 is implemented in CC2 and CC3, before and after the uplink symbol on CC1 in the time period 906. In the antenna configuration 904, the switching period 908 is implemented in CC1 and CC3, before and after the uplink symbol on CC2 in the time period 906.

The switching period 908 may be based on the time needed to switch one or more of the antennas 910, 912, 914 between carriers. For example, the switching period 908 may be based on an inherent carrier switching delay for the UE. The switching period 908 may be implemented to ensure that an antenna has completed switching from one carrier to another before a data transmission is scheduled for the antenna. During the switching period 908, an antenna being switched might not be used, and the data transmission on the antenna is interrupted.

In some implementations, a single RF component (for example, a single RF/antenna) at a UE may be used for transmission on multiple carriers. If the RF component is being switched from one of these carriers to another, then transmission on all of the carriers will be interrupted due to the switching delay for the RF component. Therefore, a BS might benefit from knowing all of the carriers that are configured for (i.e., being served by) a single RF component at a UE.

In some implementations, the carriers being served by a single RF component at a UE are grouped into a carrier bundle. Uplink and/or downlink carrier bundles might be defined separately. A UE may report a carrier bundle to a BS. The BS may then use the bundle to configure switching periods for the carriers in the carrier bundle. For example, consider a case in which a carrier bundle includes a first and a second carrier being served by an Rx/Tx RF/antenna. When the Rx/Tx RF/antenna is switched from the first carrier to a third carrier, and the third carrier is not in the carrier bundle, then the BS may configure a switching period for both the first carrier and the second carrier in the carrier bundle.

Figure 20:
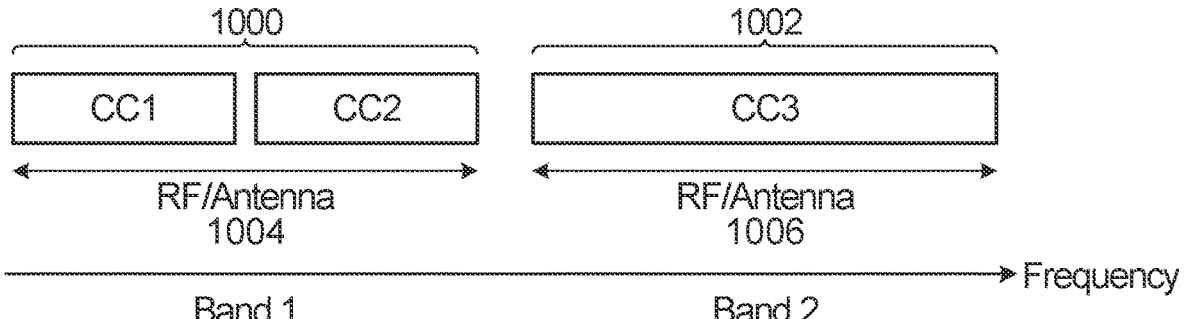
FIG. 20 illustrates two carrier bundles configured for a UE, according to an embodiment.

FIG. 20 illustrates two carrier bundles 1000, 1002 configured for a UE, according to an embodiment. The carrier bundle 1000 includes two carriers labelled as "CC1" and "CC2", which are in a first frequency band labeled as "Band 1". The carrier bundle 1002 includes one carrier labelled as "CC3", which is in a second frequency band labeled as "Band 2". An RF/antenna 1004 of the UE is configured to transmit and/or receive over CC1 and CC2, and an RF/antenna 1006 is configured to transmit and/or receive over CC3. Therefore, if the RF/antenna 1004 is switched from CC1 or CC2 to another carrier, then a BS may implement a switching period on both CC1 and CC2. This switching period may interrupt transmissions on CC1 and CC2 until the switching is complete.

In some implementations, carrier bundles are predefined based on carrier reference frequency. A BS may therefore be able to determine carrier bundles at a UE based on predefined rules, without the carrier bundles being reported by the UE. According to one example, the carriers with reference frequencies below 3 GHz may belong to a first carrier bundle, carriers with reference frequencies between 3 GHz and 5 GHz may belong to a second carrier bundle and, for carriers frequencies above 5 GHz, each carrier may belong to a different carrier bundle. According to another example, carriers within the same frequency band may belong to the same carrier bundle and carriers within different frequency bands may belong to different carrier bundles.

FIG. 21 is a flow diagram illustrating a method 1100 for an apparatus in a wireless communication network, according to an embodiment. The method 1100 will be described as being performed by an apparatus having at least one processor, a computer readable storage medium, a transmitter and a receiver. In some implementations, the computer readable storage medium is operatively coupled to the at least one processor and stores programming for execution by the at least one processor. The programming may include instructions to perform the method 1100. In some implementations, the apparatus is a UE or ED, such as the ED 110 of FIGS. 1 to 3, for example.

The apparatus may have a plurality of configured carriers and/or support a plurality of panels. To save power at the apparatus, some of the carriers and/or panels may be inactive until a burst of data traffic is received or scheduled, in which case the carriers and/or panels may be activated for data transmission and/or reception.

Step 1102 is an optional step that includes the receiver of the apparatus receiving an activation pattern from a network device such as a BS, for example. This activation pattern may be to obtain measurement information for the plurality of carriers configured at the apparatus, and may include a respective activation period to activate each carrier of the plurality of carriers. For example, the activation pattern may be similar to the round robin pattern 700 of FIG. 16.

Alternatively or additionally, the activation pattern may be to obtain measurement information for the plurality of panels at the apparatus, and may include a respective activation period to activate each panel of the plurality of panels. For example, the activation pattern may be similar to the round robin pattern 600 of FIG. 15. This activation pattern may also include an order to activate each panel of the plurality of panels. For example, the pattern may specify an order for the activation period of each panel at the apparatus.

In some implementations, step 1102 might be performed multiple times, at least once to obtain an activation pattern for the plurality carriers, and at once more to obtain an activation pattern for the plurality of panels.

Step 1104 is an optional step that includes the receiver of the apparatus receiving, from the network device, an indication to switch a plurality of RFs/antennas from one or more carriers (which may be all of the carriers configured at the apparatus) to a particular carrier for an uplink measurement on the particular carrier. This uplink measurement may be an SRS measurement, for example. The particular carrier may be a normal carrier supporting a PUSCH and uplink measurements, or a PUSCH-less carrier that does not support the PUSCH. FIG. 18 illustrates an example of switching a plurality of RFs/antennas from a plurality of carriers to a single carrier for uplink measurements.

Steps 1102, 1104 may enable measurement information to be obtained for the plurality of carriers configured for the apparatus and/or for the plurality of panels supported by the apparatus. This measurement information may be obtained in advance of activating the carriers and/or panels for data transmission or reception, which could reduce carrier and/or panel activation delay.

Step 1106 includes the receiver of the apparatus receiving activation information for at least one carrier from the network device, optionally via RRC signaling, MAC signaling or DCI. The activation information may include at least one of synchronization information, beam management information or AGC setting information for the at least one carrier. In step 1108, the receiver of the apparatus receives, from the network device, an indication to activate a carrier of the at least one carrier. The at least one processor of the apparatus then activates the carrier in step 1110, based on the activation information received in step 1106. Activating the carrier in step 1110 may include performing synchronization, beam management or AGC setting for the carrier. Once activated, data communications may be scheduled on the carrier.

In some implementations, the activation information received in step 1106 is independent of an SSB. The apparatus therefore might not have to use an SSB to perform synchronization, beam management or AGC setting for the carrier, and may therefore avoid an increase in carrier activation delay due to an SMTC, for example.

In some implementations, the activation information received in step 1106 includes an indication of a reference carrier. Activating the carrier in step 1110 may then include performing at least one of synchronization, beam management or AGC setting for the carrier based on the reference carrier. For example, step 1110 may include performing synchronization for the carrier based on a synchronization to the reference carrier, performing beam management for the carrier based on a beam of the reference carrier, and/or performing AGC setting for the carrier based on a pathloss and/or a coupling loss of the reference carrier.

In some implementations, the activation information received in step 1106 includes an indication of a CSI-RS. Activating the carrier in step 1110 may then include performing synchronization and/or AGC setting for the carrier based on the CSI-RS.

In some implementations, the activation information received in step 1106 includes an indication of a beam for the carrier, and activating the carrier in step 1110 includes performing beam management for the carrier based on the indication of the beam.

In some implementations, the activation information received in step 1106 includes an indication of a pathloss and/or a coupling loss for the carrier, and activating the carrier in step 1110 includes performing AGC setting for the carrier based on the indication of the pathloss and/or the coupling loss.

The process 450 of FIG. 12 provides an example implementation of steps 1106, 1108, 1110.

Step 1112 is an optional step that includes the receiver of the apparatus receiving, from the network device, an indication of at least one active panel at the apparatus. The apparatus may then activate and/or deactivate one or more panels based on the indication. In some implementations, the indication is received via DCI. Step 1112 may include the receiver of the apparatus receiving a first DCI including an indication of at least one active transmit panel at the apparatus and a second DCI including an indication of at least one active receive panel at the apparatus. The first and second DCI may be different and may be received separately at the apparatus.

The DCI 510, 512 of FIGS. 13 and 14 provide examples of DCI that may be received in step 1112.

In some implementations, the DCI received in step 1112 further includes an indication of one or more scheduled panels at the apparatus. Optional step 1114 then includes the transmitter and/or the receiver of the apparatus transmitting and/or receiving data using the one or more scheduled panels. In some cases, the apparatus is configured to implement a timing gap between steps 1112, 1114 in order to allow the one or more scheduled panels to be fully activated before transmitting and/or receiving data. This timing gap may be based on a number of active panels at the apparatus and/or a number of scheduled panels at the apparatus.

Figure 22:
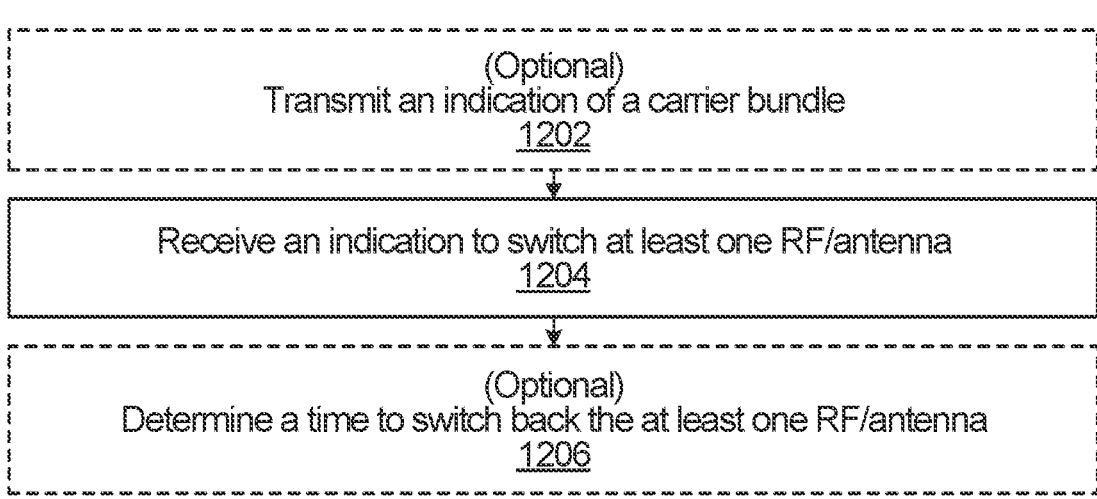
FIG. 22 illustrates, in a flow chart, a method according to embodiments of the present disclosure.

FIG. 22 is a flow diagram illustrating a method 1200 for an apparatus in a wireless communication network, according to another embodiment. The method 1200 will be described as being performed by an apparatus having at least one processor, a computer readable storage medium, a transmitter and a receiver. In some implementations, the computer readable storage medium is operatively coupled to the at least one processor and stores programming for execution by the at least one processor. The programming may include instructions to perform the method 1200. In some implementations, the apparatus is a UE or ED, such as the ED 110 of FIGS. 1 to 3, for example. The same apparatus may perform both of the methods 1100, 1200.

The apparatus may have a plurality of configured carriers. In some cases, these carriers are arranged into one or more carrier bundles, where each carrier bundle may include carriers that are served using the same RF components at the apparatus. Step 1202 is an optional step that includes the transmitter of the apparatus transmitting, to a network device such as a BS, an indication of a carrier bundle configured at the apparatus. However, step 1202 might not be performed in some implementations. For example, the network device may instead determine a predefined carrier bundle based on a range of carrier frequencies. FIG. 20 illustrates examples of carrier bundles 1000, 1002.

Step 1204 includes the receiver of the apparatus receiving, from the network device, an indication to switch a first RF/antenna from a first carrier of the plurality of carriers to a second carrier of the plurality of carriers. The indication may be based on a performance of the second carrier. For example, the second carrier may be exhibiting higher data throughput, lower delay and/or enhanced coverage compared to other configured carriers. Switching the first RF/antenna to the second carrier may therefore enable the first RF/antenna to benefit from the better performance of the second carrier. This is an example of dynamic or flexible RF/antenna switching. The indications 920, 922 of FIG. 19 are examples of indications that may be received in step 1204.

In some implementations, step 1204 further includes the receiver of the apparatus receiving an indication to switch multiple RFs/antennas (or even all of the RFs/antennas at the apparatus) from multiple carriers to the second carrier. For example, the indication may be to switch a second RF/antenna from a third carrier of the plurality of carriers to the second carrier.

Step 1204 may also include receiving an indication of a first time to switch the first RF/antenna from the first carrier to the second carrier and/or an indication of a second time to switch the first RF/antenna from the second carrier back to the first carrier. Alternatively, the at least one processor of the apparatus may determine the second time based on a predefined rule in optional step 1206.

As noted above, the plurality of carriers configured for the apparatus may be organized into carrier bundles, which may include a predefined carrier bundle. Step 1204 may include receiving an indication of a switching period for each carrier in the carrier bundle, which ensures that transmissions are not scheduled on the carriers in the carrier bundle when the switching is occurring.

Figure 23:
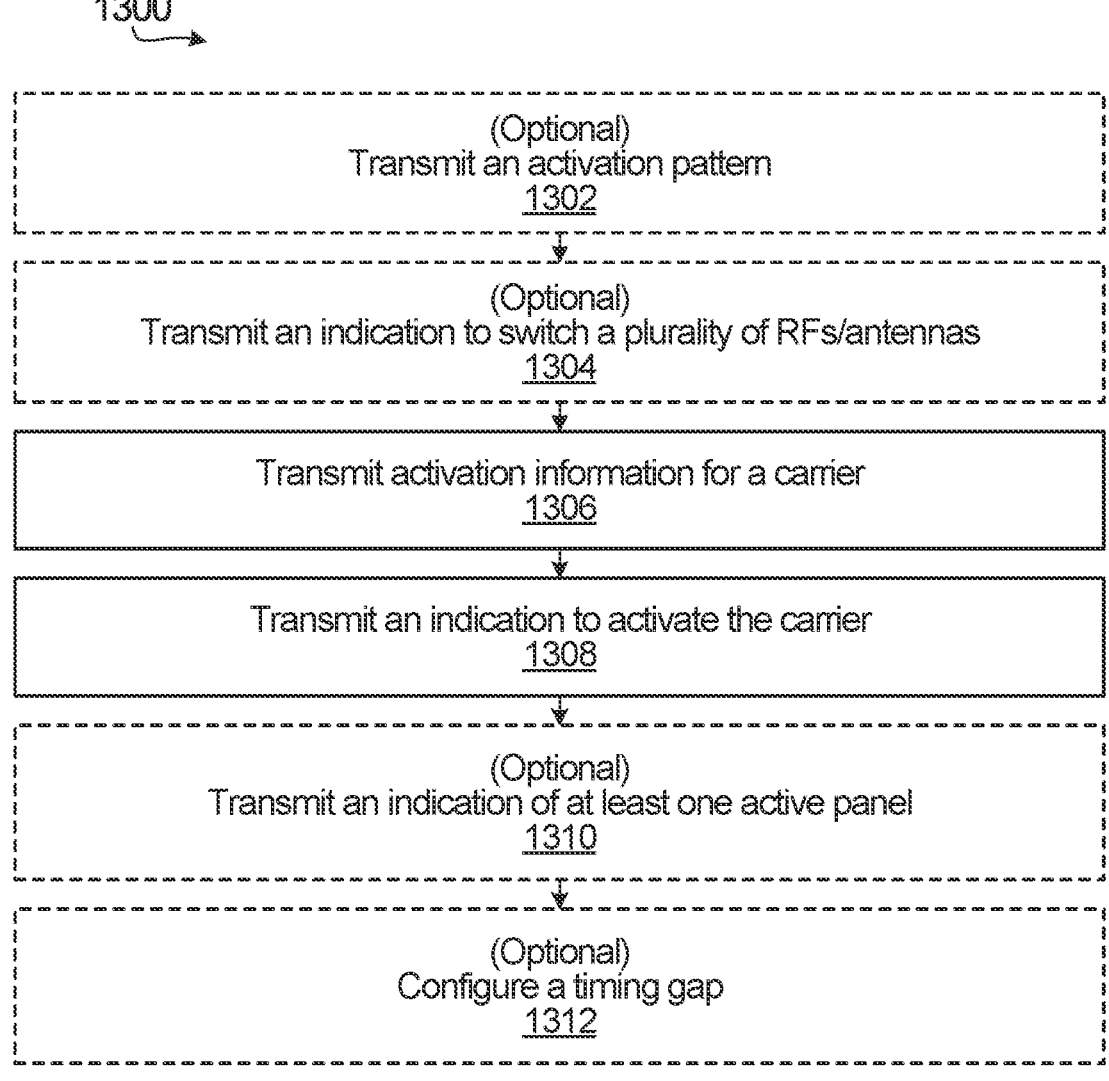
FIG. 23 illustrates, in a flow chart, a method according to embodiments of the present disclosure.

FIG. 23 is a flow diagram illustrating a method 1300 for network device in a wireless communication network, according to an embodiment. The method 1300 will be described as being performed by a network device having at least one processor, a computer readable storage medium, a transmitter and a receiver. In some implementations, the computer readable storage medium is operatively coupled to the at least one processor and stores programming for execution by the at least one processor. The programming may include instructions to perform the method 1300. In some implementations, the network device is a BS or TRP, such as the T-TRP 170 or the NT-TRP 172 of FIGS. 1 to 3, for example.

Step 1302 is an optional step includes the transmitter of the network device transmitting, to an apparatus such as a UE, at least one activation pattern. The activation pattern may be used by the apparatus to obtain measurement information for a plurality of carriers configured at the apparatus, in which case the activation pattern may include a respective activation period to activate each carrier of the plurality of carriers. An example of such an activation pattern is the round robin pattern 700 of FIG. 16.

Alternatively or additionally, an activation pattern received in step 1302 may be to obtain measurement information for a plurality of panels at the apparatus, the activation pattern including a respective activation period to activate each panel of the plurality of panels. This activation pattern may further include an order to activate each panel of the plurality of panels at the apparatus. An example of an activation pattern to obtain measurement information for a plurality of panels is the round robin pattern 600 of FIG. 15.

Step 1304 is an optional step that includes the transmitter of the network device transmitting, to the apparatus, an indication to switch a plurality of RFs/antennas at the apparatus from one or more carriers to a particular carrier for an uplink measurement on the particular carrier. An example of such switching is shown in FIG. 18. The uplink measurement may include an SRS measurement, and the particular carrier might not support a PUSCH.

Steps 1302, 1304 may configure the apparatus to obtain measurement information for one or more carriers and/or panels in advance of activating the carriers and/or panels, which may reduce carrier and/or panel activation delay.

Step 1306 includes the transmitter of the network device transmitting, to the apparatus, activation information for at least one carrier at the apparatus, the activation information including at least one of synchronization information, beam management information or AGC setting information for the at least one carrier. The activation information may be transmitted in RRC signaling, MAC signaling or DCI. Examples of the activation information are provided elsewhere herein, for example, with reference to the method 1100 of FIG. 21. Step 1308 then includes the transmitter of the network device transmitting, to the apparatus, an indication to activate a carrier of the at least one carrier. The apparatus may activate the carrier based on the activation information. The process 450 of FIG. 12 provides an example implementation of steps 1306, 1308.

Optional step 1310 includes the transmitter of the network device transmitting, to the apparatus, an indication of at least one active panel at the apparatus. Step 1310 may further include transmitting an indication of a scheduled panel of the at least one active panel at the apparatus. The indication(s) may be sent in DCI. In some implementations, step 1310 includes transmitting first DCI including an indication of at least one active transmit panel at the apparatus and transmitting second DCI including an indication of at least one active receive panel at the apparatus. The first and second DCI may be different and may be transmitted at different times. The DCI 510, 512 of FIGS. 13 and 14 provide examples of DCI that may be transmitted in step 1310.

Step 1312 may be performed by the at least one processor of the network device in some implementations. Step 1312 includes configuring a timing gap between transmitting the DCI to the apparatus in step 1310 and scheduling data transmission or reception using the scheduled panel at the apparatus. This timing gap may help ensure that the scheduled panel is completely activated in response to the DCI before a data transmission or reception is scheduled. The timing gap may be configured based on a number of active panels at the apparatus and/or a number of scheduled panels at the apparatus.

Figure 24:
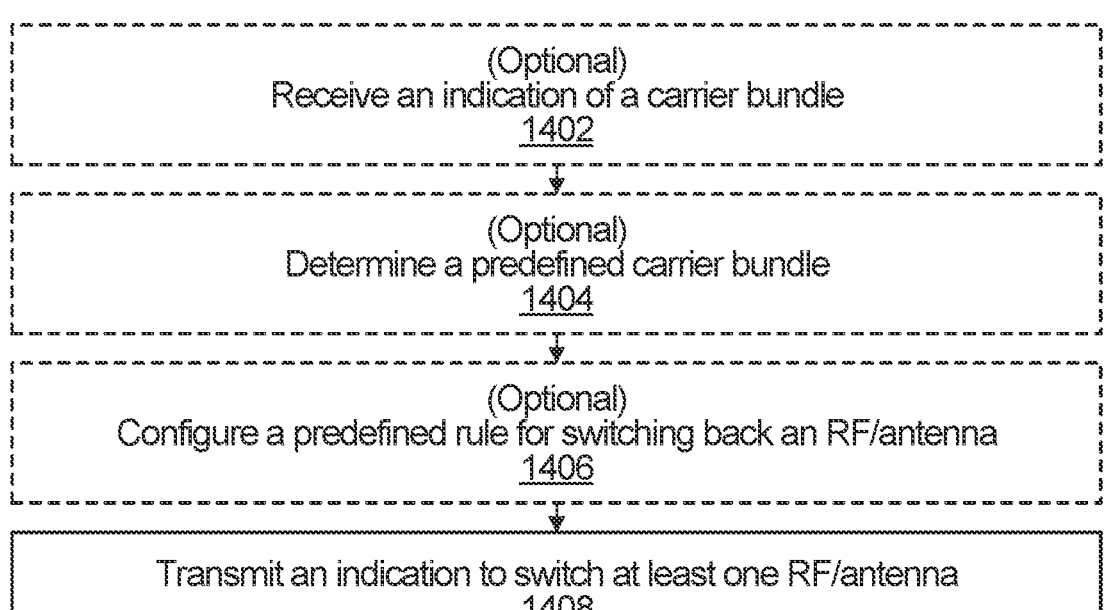
FIG. 24 illustrates, in a flow chart, a method according to embodiments of the present disclosure.

FIG. 24 is a flow diagram illustrating a method 1400 for network device in a wireless communication network, according to another embodiment. The method 1400 will be described as being performed by a network device having at least one processor, a computer readable storage medium, a transmitter and a receiver. In some implementations, the computer readable storage medium is operatively coupled to the at least one processor and stores programming for execution by the at least one processor. The programming may include instructions to perform the method 1400. In some implementations, the network device is a BS or TRP, such as the T-TRP 170 or the NT-TRP 172 of FIGS. 1 to 3, for example. The same network device may perform both of the methods 1300, 1400.

Optional steps 1402, 1404 relate to determining a carrier bundle for plurality of carriers configured at an apparatus such as a UE, for example. Carrier bundles 1000, 1002 of FIG. 20 are examples of carrier bundles that may be determined in steps 1402, 1404. The carrier bundle may be used to configure switching periods for multiple carriers at the apparatus that are served using the same RF components, for example. In step 1402, the receiver of the network device receives an indication of a carrier bundle at the apparatus. Alternatively, in step 1404, the at least one processor determines a predefined carrier bundle based on a range of carrier frequencies at the apparatus.

In optional step 1406, the at least one processor of the network device may configure a predefined rule to determine a time for RF/antenna switching back at the apparatus. This predefined rule may be provided to the apparatus through control signaling, for example.

Step 1408 includes the transmitter of the network device transmitting, to the apparatus, an indication to switch a first RF/antenna at the apparatus from a first carrier of the plurality of carriers to a second carrier of the plurality of carriers. The induction may further be to switch a second RF/antenna at the apparatus from a third carrier of the plurality of carriers to the second carrier. Indications for switching additional RFs/antennas to the second carrier are also possible in step 1408. The indications 920, 922 of FIG. 19 are examples of indications that may be transmitted in step 1408.

In some implementations, the indication transmitted in step 1408 is based on a performance of the second carrier, such as a data transmission rate, data coverage and or delay exhibited by the second carrier, for example. This is an example of dynamic or flexible RF/antenna switching.

In some implementations, the indication transmitted in step 1408 includes a first time to switch the first RF/antenna from the first carrier to the second carrier, and optionally a second time to switch the first RF/antenna from the second carrier back to the first carrier. Alternatively, the apparatus may determine the second time based on the predefined rule configured in step 1406. The first and second times might also apply to switching the second RF/antenna from the third carrier to the second carrier, and then back to the third carrier.

In some implementations, the indication transmitted in step 1408 includes an indication of a switching period for the carriers in a carrier bundle at the apparatus. This carrier bundle may have been determined in one of steps 1402, 1404, for example.

It should be noted that the order of the steps in FIGS. 21 to 24 are provided by way of example only. Other orders of these steps, including steps that are performed simultaneously (for example, performing two or more steps in a single transmission or reception), are also contemplated.

Although the present disclosure describes methods and processes with steps in a certain order, one or more steps of the methods and processes may be omitted or altered as appropriate. One or more steps may take place in an order other than that in which they are described, as appropriate.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for an apparatus in a wireless communication network, the method comprising:
receiving, by the apparatus from a network device, activation information for a carrier of a cell, the activation information comprising at least one of synchronization information, beam management information, or automatic gain control (AGC) setting information for the carrier, the activation information further comprising an indication of a reference carrier of the cell;
receiving, by the apparatus from the network device, an indication to activate the carrier; and
activating, by the apparatus, the carrier based on the activation information.

2. The method of claim 1, wherein the activation information is independent of a synchronization signal block (SSB).

3. The method of claim 1, wherein:
activating the carrier comprises performing at least one of synchronization, beam management, or AGC setting for the carrier based on the reference carrier.

4. The method of claim 3, wherein the activating the carrier comprises performing the synchronization for the carrier based on a synchronization to the reference carrier.

5. The method of claim 3, wherein the activating the carrier comprises performing the beam management for the carrier based on a beam of the reference carrier.

6. The method of claim 3, wherein the activating the carrier comprises performing the AGC setting for the carrier based on at least one of a pathloss or a coupling loss of the reference carrier.

7. The method of claim 1, wherein:
the activation information comprises an indication of a channel state information reference signal (CSI-RS); and
the activating the carrier comprises performing at least one of synchronization or AGC setting for the carrier based on the CSI-RS.

8. The method of claim 1, wherein:
the activation information comprises an indication of a beam for the carrier; and
the activating the carrier comprises performing beam management for the carrier based on the indication of the beam.

9. The method of claim 1, wherein:
the activation information comprises at least one of an indication of a pathloss or a coupling loss for the carrier; and
the activating the carrier comprises performing AGC setting for the carrier based on the indication of at least one of the pathloss or the coupling loss.

10. The method of claim 1, wherein the receiving the activation information comprises receiving the activation information via radio resource control (RRC) signaling, medium access control (MAC) signaling or downlink control information (DCI).

11. The method of claim 1,
wherein the activation information comprises the synchronization information, the beam management information, and the AGC setting information, and
wherein at least two of the synchronization information, the beam management information, or the AGC setting information are associated with at least two different respective reference carriers of the cell.

12. A method for a network device in a wireless communication network, the method comprising:
transmitting, by the network device to an apparatus, activation information for a carrier of a cell, the activation information comprising at least one of synchronization information, beam management information, or automatic gain control (AGC) setting information for the carrier, the activation information further comprising an indication of a reference carrier of the cell; and
transmitting, by the network device to the apparatus, an indication to activate the carrier, wherein the transmitting the indication causes the apparatus to activate the carrier based on the activation information.

13. The method of claim 12, wherein the activation information is independent of a synchronization signal block (SSB).

14. The method of claim 12, wherein the transmitting the indication causes the apparatus to perform at least one of synchronization, beam management, or AGC setting for the carrier based on the reference carrier.

15. The method of claim 14, wherein the transmitting the indication causes the apparatus to perform the synchronization for the carrier based on a synchronization to the reference carrier.

16. The method of claim 14, wherein the transmitting the indication causes the apparatus to perform the beam management for the carrier based on a beam of the reference carrier.

17. The method of claim 14, wherein the transmitting the indication causes the apparatus to perform at least one of AGC setting for the carrier based on a pathloss or a coupling loss of the reference carrier.

18. The method of claim 12, wherein the transmitting the indication causes the apparatus to perform at least one of synchronization and/or AGC setting for the carrier based on a channel state information reference signal (CSI-RS) indicated by the activation information.

19. The method of claim 12, wherein the transmitting the indication causes the apparatus to perform beam management for the carrier based on a beam indicated by the activation information.

20. An apparatus comprising:

at least one processor; and a computer-readable storage medium operatively coupled to the at least one processor, the computer-readable storage medium storing programming for execution by the at least one processor, the programming comprising instructions that cause the apparatus to:

receive, from a network device, activation information for a carrier of a cell, the activation information comprising at least one of synchronization information, beam management information, or automatic gain control (AGC) setting information for the carrier, the activation information further comprising an indication of a reference carrier of the cell;

receive, from the network device, an indication to activate the carrier; and activate the carrier based on the activation information.

21. A network device comprising:

at least one processor; and a computer-readable storage medium operatively coupled to the at least one processor, the computer-readable storage medium storing programming for execution by the at least one processor, the programming comprising instructions that cause the network device to:

transmit, to an apparatus, activation information for a carrier of a cell, the activation information comprising at least one of synchronization information, beam management information or automatic gain control (AGC) setting information for the carrier, the activation information further comprising an indication of a reference carrier of the cell; and transmit, to the apparatus, an indication to activate the carrier, wherein transmitting the indication causes the apparatus to activate the carrier based on the activation information.

* * * * *